(12) United States Patent
Nagamatsu

(10) Patent No.: US 8,024,754 B2
(45) Date of Patent: Sep. 20, 2011

(54) CONTENT PROCESSING DEVICE, CONTENT PROCESSING METHOD, CONTROL PROGRAM, AND STORAGE MEDIUM

(75) Inventor: Takayuki Nagamatsu, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 1151 days.

(21) Appl. No.: 11/367,675

(22) Filed: Mar. 6, 2006

(65) Prior Publication Data

US 2007/0192792 A1    Aug. 16, 2007

(30) Foreign Application Priority Data

Feb. 13, 2006   (JP) ................................ 2006-035787

(51) Int. Cl.
  *G06F 13/00*    (2006.01)
  *G06F 3/00*     (2006.01)
  *H04N 5/445*    (2006.01)

(52) U.S. Cl. ............... 725/39; 725/40; 725/41; 725/42; 725/43; 725/44; 725/45; 725/46; 725/47; 725/48; 725/49; 725/50; 725/51; 725/52; 725/53

(58) Field of Classification Search ............... 725/39–53
  See application file for complete search history.

(56) References Cited

U.S. PATENT DOCUMENTS

| | | | | |
|---|---|---|---|---|
| 6,601,237 | B1 * | 7/2003 | Ten Kate et al. | 725/47 |
| 6,725,215 | B2 | 4/2004 | Yamamoto | |
| 7,082,613 | B1 * | 7/2006 | Mineyama | 725/46 |
| 2002/0052864 | A1 * | 5/2002 | Yamamoto | 707/1 |
| 2002/0053084 | A1 * | 5/2002 | Escobar et al. | 725/47 |
| 2002/0146235 | A1 * | 10/2002 | Watanabe et al. | 386/52 |
| 2003/0121041 | A1 * | 6/2003 | Mineyama | 725/46 |
| 2005/0021507 | A1 * | 1/2005 | Yamamoto | 707/3 |
| 2005/0114214 | A1 * | 5/2005 | Itoh | 705/14 |
| 2006/0010464 | A1 * | 1/2006 | Azami | 725/9 |
| 2006/0174269 | A1 * | 8/2006 | Hansen-Turton | 725/39 |
| 2007/0006266 | A1 * | 1/2007 | Yamamoto | 725/46 |
| 2007/0074245 | A1 * | 3/2007 | Nyako et al. | 725/34 |
| 2007/0174872 | A1 * | 7/2007 | Jing et al. | 725/46 |

FOREIGN PATENT DOCUMENTS

| | | |
|---|---|---|
| EP | 1 079 623 A1 | 2/2001 |
| JP | 2000-261742 A | 9/2000 |
| JP | 2001-086015 A | 3/2001 |
| JP | 2001-326867 A | 11/2001 |
| JP | 2002-230946 A | 8/2002 |
| JP | 2004-328244 A | 11/2004 |
| JP | 2005-122075 A | 5/2005 |
| WO | WO-00/40021 | 7/2000 |
| WO | WO-01/39494 A1 | 5/2001 |
| WO | WO-01/74060 A1 | 10/2001 |
| WO | WO-2005/029859 A1 | 3/2005 |

* cited by examiner

*Primary Examiner* — Pankaj Kumar
*Assistant Examiner* — Mulugeta Mengesha
(74) *Attorney, Agent, or Firm* — Birch, Stewart, Kolasch & Birch, LLP

(57) ABSTRACT

To add new additional content to the reproduction schedule on the basis of reference content scheduled in a time slot in the reproduction schedule, a digital television in accordance with the present invention includes: an additional content extracting section for identifying, as the additional content, content associated with content information which meets conditions determined on the basis of content information of the reference content; and a placement position determining section for determining, based on time slot determining procedure information based on which a time slot is determined for the additional content related to the reference content, a time slot for the additional content identified by the additional content identifying means. The digital television therefore produces an optimal reproduction schedule to the user.

14 Claims, 20 Drawing Sheets

FIG. 3

| Content ID | Media Types | Source | | Title of Content | Episode Info. | Program Content | Personality | Key Word | Program Starting Time | Program Ending Time | Category |
|---|---|---|---|---|---|---|---|---|---|---|---|
| ID001 | Broadcast | A Broadcasting Corp. | 011-1/021 | Content A-1 | — | ********** | Actor A | ○○○ | 3:00 PM | 5:00 PM | Drama |
| ID002 | Stored | A Broadcasting Corp. | 011B | Content A-2 | — | ********** | Actor A | ×  ×  × | 5:00 PM | 7:00 PM | Drama |
| ID003 | Broadcast | B Broadcasting Corp. | 041/042/043 | Content B-5 | — | ********** | Player B | △△△ | 7:00 PM | 8:00 PM | Sports |
| ID004 | Broadcast | AE Broadcasting Corp. | 031/032 | Content E-1 | — | ********** | | ○△○ | 3:40 PM | 4:20 PM | Info./Entertainment |
| ID005 | Delivered | C Corp. | 192.168.31.174 | Content C-1 | — | ********** | Actor C | ○○△ | 3:00 PM | 4:30 PM | Movies |
| ID006 | Stored | | 00F1 | Content C-11 | C01-1/4 | **Ad 1 | Actor C | ○○△ | | | Ad. |
| ID007 | Stored | | 00F2 | Content C-12 | C01-2/4 | **Ad 2 | Actor C | ○○△ | | | Ad. |
| ID008 | Stored | | 00F3 | Content C-13 | C01-3/4 | **Ad 3 | Actor C | ○○△ | | | Ad. |
| ID009 | Stored | | 00F4 | Content C-14 | C01-4/4 | **Ad 4 | Actor C | ○○△ | | | Ad. |
| ID010 | Stored | | Drive (E:) | Content D-3 | — | ********** | Actress D | ○ × × | | | Movies |
| ID011 | Broadcast | F Broadcasting Corp. | 021/022 | Content F-1 | — | ********** | Singer F | × ○○ | 5:00 PM | 5:50 PM | Music |
| ID012 | Stored | AE Broadcasting Corp. | 010A | Content G-1 | G01-1/2 | Synopsis of Episode I | | △○× | 2:45 PM | 3:00 PM | Drama |
| ID013 | Broadcast | | 033 | Content G-2 | G01-2/2 | (Episode II) ○○○○○ | | △○× | 3:00 PM | 5:00 PM | Drama |
| ID014 | Delivered | H Media Corp. | 192.168.20.23 | Content H-1 | — | ********** | | □ × ○ | 5:00 PM | 5:50 PM | News/Report |
| ID015 | Delivered | H Media Corp. | 192.168.20.23 | Content H-2 | — | ********** | | □ × ○ | 5:50 PM | 8:00 PM | News/Report |
| ID016 | Broadcast | D Broadcasting Corp. | 081/082/083 | Content K-3 | — | ********** | | △ ○ □ | 5:00 PM | 6:10 PM | Info./Entertainment |
| ID017 | Broadcast | D Broadcasting Corp. | 081/082/083 | Content L-7 | — | ********** | Singer L | □ □ × | 6:10 PM | 7:40 PM | Music |

| Procedure Code | 1 | 2 | 3 | 4 | 5 | 6 |
|---|---|---|---|---|---|---|
| A01 | 0 | 0 | — | — | — | — |
| A02 | 0 | 1 | — | — | — | — |
| A03 | 1 | 0 | 1 | — | — | — |
| A04 | 1 | 1 | 0 | — | — | — |
| A05 | 1 | 1 | 1 | From 0X:00 | To 0X:00 | — |
| A06 | 1 | 1 | 1 | — | To 0X:00 | — |
| A07 | 1 | 1 | 1 | From 0X:00 | — | — |
| A08 | 1 | 0 | 0 | — | — | 7 days after starting time |
| A09 | 1 | 0 | 0 | — | — | 1 day before starting time |
| A10 | 1 | 0 | 0 | — | — | 1 day after ending time |
| A11 | 1 | 0 | 0 | — | — | 3 hours before ending time |
| : | : | : | : | : | : | : |

142

| Reference content | Procedure Code |
|---|---|
| ID001 | A08 |
| ID002 | A02 |
| ID003 | A05 |
| ID004 | A03 |
| ID005 | A03 |
| ID006 | A06 |
| ID007 | A07 |
| ID008 | A08 |
| ID009 | A09 |
| ID010 | A10 |
| ID011 | A11 |
| ID012 | A06 |
| ID013 | A03 |
| ID014 | A04 |
| ID015 | A05 |
| ID016 | A07 |
| ID017 | A01 |
| : | : |

FIG. 5

| Time | Channel 1 | Channel 2 | Local Channel |
|---|---|---|---|
| 151 | 152 | 153 | 154 |

| Time | Channel 1 | Channel 2 | Local Channel |
|---|---|---|---|
| 19:00 ~ 20:00 | Content A—1 | Content C—1 | |
| | Content B—5 | | Content A—2 |
| | | Content D—3 | |
| 20:00 ~ 21:00 | Content E—1 | Content F—1 | Content G—1 |
| | | Content G—2 | |
| | | Content H—1 | |

FIG. 9

| Time | Channel 1 | Channel 2 | Local Channel |
|------|-----------|-----------|---------------|
| 19:00 ~ 20:00 | A | D | H |
|  |  |  | I |
|  | B |  | J |
|  |  | E | K |
| 20:00 ~ 21:00 | C | F | L |
|  |  | Content G−2 | M |
|  |  | G | N |

FIG. 10

| Time | Channel 1 | Channel 2 |
|---|---|---|
| 19:00 ~ 20:00 | Content A－1 | Content C－1 |
| | Content B－5 | |
| | | Content D－3 |
| 20:00 ~ 21:00 | Content E－1 | Content F－1 |
| | | Content G－2 |
| | | Content H－1 |

FIG. 11

| Time | Channel 1 | Channel 2 |
|---|---|---|
| 19:00 ~ 20:00 | Content A-1 | Content C-1 |
| | Content B-5 | |
| | | Content A-2 |
| 20:00 ~ 21:00 | Content E-1 | Content G-1 |
| | | Content G-2 |
| | | Content H-1 |

| Reference Content | Additional Content | Procedure Code |
|---|---|---|
| ID001 | ID002 | A04 |
| ID005 | ID006 | A06 |
| ID005 | ID007 | A03 |
| ID005 | ID009 | A04 |
| : | : | : |

| Reference Content | Procedure Code | Placement Position |
|---|---|---|
| ID002 | A02 | E |
| ID003 | A05 | B、E、F、J、K、L |
| ID004 | A03 | B |
| ID011 | A11 | D、E |
| : | : | : |

162

| Placement Position | Reference Content |
|---|---|
| B | ID003、ID004 |
| D | ID011 |
| E | ID002、ID003、ID011 |
| F | ID003 |
| J | ID003 |
| K | ID003 |
| L | ID003 |
| : | : |

FIG. 19

| Time | Channel 1 | Channel 2 |
|---|---|---|
| 19:00 ~ 20:00 | Content A—1 | Content C—1 |
| | Content B—5 | |
| | | Content D—3 |
| 20:00 ~ 21:00 | Content E—1 | Content F—1 |
| | | Content G—2 |
| | | Content H—1 |

192 — Content G—1

191

CONTENT PROCESSING DEVICE, CONTENT PROCESSING METHOD, CONTROL PROGRAM, AND STORAGE MEDIUM

This nonprovisional application claims priority under 35 U.S.C. §119(a) on Patent Application No. 2006-35787 filed in Japan on Feb. 13, 2006, the entire contents of which are hereby incorporated by reference.

FIELD OF THE INVENTION

The present invention relates to a content processing device, content processing method, control program, and storage medium which manages a content reproduction schedule.

BACKGROUND OF THE INVENTION

Conventionally, people often record a television program (content) on a video tape or other storage medium to replay and watch it after the broadcast time. Mass storage media are recently popular in line with widespread use of hard disk recorders and DVD recorders as well as video tapes. Large numbers of television programs can be recorded on these mass storage media once the programs are digitized, allowing the user to replay and watch the recorded television programs when convenient to the user. This kind of mass recording of digitized content happens not only with television broadcast programs, but with content distributed over the Internet and content distributed to mobile terminals.

The user selects desired content which they want to reproduce from the large amount of stored content, to view the content. However, it is a great burden for the user to perform manipulation to find the desired content in the large amount of content. The burden grows if the user is to select content they want to view from the content found in delivery plan tables provided by content providers which is planned to be broadcast (distributed), as well as the content in electronic program tables provided by broadcast stations. Therefore, there are demands for convenient content processing devices which enable the user to identify the content the user prefers from the huge amount of content that the user can view and produce their own schedules.

For example, Japanese Unexamined Patent Publication 2004-328244 (Tokukai 2004-328244; published on Nov. 18, 2004) discloses a broadcast receiver device which produces a stored program index for stored programs (content) and displays the index and an EPG program table for broadcast programs on screen at the same time. More specifically, the broadcast receiver device searches for reproducible recorded programs before the broadcast of a program the user wants to view starts. The device then presents to the user. Accordingly, the user can select a recorded program so that they can reproduce broadcast programs they want to view without missing the programs.

Japanese Unexamined Patent Publication 2005-156996 (Tokukai 2005-156996; published on Jun. 16, 2005) discloses a management server which selects substitute advertisement information (second content) on the basis of the story pattern data (content information) for original advertisement information (first content) and the story pattern data indicating a content substance which matches with user preference. Accordingly, a reproduction device can reproduce the substitute advertisement information which matches with user preference in the original advertisement information.

Published Japanese Translation of PCT Application 2002-534860 (Tokuhyo 2002-534860; published on Oct. 15, 2002) discloses a program reproduction device which produces a personal reproduction schedule from all desired broadcast programs (first content) in accordance with a user profile. If there is more than one broadcast program in the same time slot which the user wants to have included in the schedule, the Tokuhyo 2002-534860 program reproduction device excludes the program with lower priority from the schedule, but records that program as a stored program (second content). When there occurs an free time slot in the broadcast program schedule, the device schedules the stored program, considering the duration of the free time slot and the duration of the reproduction time.

However, the devices disclosed in Tokukai 2004-328244, Tokukai 2005-156996, and Tokuhyo 2002-534860 entail following problems.

The Tokukai 2004-328244 broadcast receiver device considers only the length of reproduction time, the starting time, and the ending time of the stored program or the broadcast program. The device does not consider program (content) substance or relationships between stored and broadcast programs. That is, reproducible programs are scheduled only in consideration of time. The stored program index (reproduction schedule) produced that way is not always optimal to users.

The Tokukai 2005-156996 management server can only substitute the substitute advertisement information for the original advertisement information. The device allows poor flexibility in scheduling. For example, the device cannot reproduce desired advertisement information in a desired sequence. The device does not produce a schedule that is always optimal to the user.

The Tokuhyo 2002-534860 program reproduction device identifies a stored program which will fill in a free time slot in the personal reproduction schedule (reproduction schedule) merely by determining whether the program fits in to the free time slot. Therefore, similarly to Tokukai 2004-328244, the personal reproduction schedule is not always optimal to the user.

SUMMARY OF THE INVENTION

The present invention has an objective to provide a content processing device, content processing device, content processing method, control program, and storage medium managing a content reproduction schedule which produces an optimal reproduction schedule for the user.

A content processing device in accordance with the present invention, to achieve the objective, is characterized in that it is a content processing device for managing a reproduction schedule specifying time slots in which content is reproduced, each piece of content being associated with content information indicating an attribute of the piece of content, to add new additional content to the reproduction schedule on the basis of reference content scheduled in a time slot in the reproduction schedule, the device including: an additional content extracting section for identifying, as the additional content, content associated with content information which meets conditions determined on the basis of content information of the reference content; and a placement position determining section for determining, based on time slot determining procedure information based on which a time slot is determined for the additional content related to the reference content, a time slot for the additional content identified by the additional content extracting section.

A content processing method in accordance with the present invention, to achieve the objective, is characterized in that it is a content processing method implemented by a content processing device for managing a reproduction schedule specifying time slots in which content is reproduced, each piece of content being associated with content information indicating an attribute of the piece of content, to add new additional content to the reproduction schedule on the basis of reference content scheduled in a time slot in the reproduction schedule, the method including the steps of: (a) identifying, as the additional content, content associated with content information which meets conditions determined on the basis of content information of the reference content; and (b) determining, based on time slot determining procedure information based on which a time slot is determined for the additional content related to the reference content, a time slot for the additional content identified in step (a).

According to the configuration, the additional content extracting section identifies, as the additional content, content having content information which meets conditions determined on the basis of content information of content which is/will be scheduled in a reproduction schedule to serve as a reference (reference content). Additional content is content the user wants to add to the reproduction schedule apart from the reference content.

Content information is information which indicates an attribute of content and is stored for each piece of content in association with that piece of content.

Next, the placement position determining section determines where (in which time slot) to schedule the additional content identified by the additional content extracting section in the reproduction schedule, based on time slot determining procedure information of the reference content.

Accordingly, it becomes possible to select the additional content having content information which meets the conditions on the basis of the content information of the reference content scheduled in the reproduction schedule and to schedule the selected additional content in the time slot determined on the basis of the time slot determining procedure information of the reference content.

Accordingly, once the reference content is determined, content closely related to the reference content can be scheduled in a time slot near the reference content in the reproduction schedule. Therefore, a reproduction schedule can be produced in which related pieces of content are scheduled together close to each other.

As a result, it becomes possible to produce an optimal, convenient reproduction schedule to the user according to which the user can collectively view related content.

Another content processing device in accordance with the present invention, to achieve the objective, is characterized in that it is a content processing device for managing a reproduction schedule specifying time slots in which content is reproduced, each piece of content being associated with content information indicating an attribute of the piece of content, to determine, on the basis of reference content scheduled in a time slot in the reproduction schedule, a time slot for additional content newly added to the reproduction schedule, the device including: a reference content identifying section for identifying, as the reference content, content associated with content information which meets conditions determined on the basis of content information of the additional content; and a placement position determining section for determining a time slot for the additional content based on time slot determining procedure information based on which a time slot is determined for the additional content related to the reference content identified by the reference content identifying section.

Another content processing method in accordance with the present invention, to achieve the objective, is characterized in that it is a content processing method implemented by a content processing device for managing a reproduction schedule specifying time slots in which content is reproduced, each piece of content being associated with content information indicating an attribute of the piece of content, to determine, on the basis of reference content scheduled in a time slot in the reproduction schedule, a time slot for additional content newly added to the reproduction schedule, the method including the steps of: (a) identifying, as the reference content, content associated with content information which meets conditions determined on the basis of content information of the additional content; and (b) determining a time slot for the additional content based on time slot determining procedure information based on which a time slot is determined for the additional content related to the reference content identified in step (a).

According to the configuration, the reference content identifying section identifies, as the reference content, content having content information which meets conditions determined on the basis of the content information of the additional content determined in advance to be added to the reproduction schedule. The content information of the reference content is used to identify the additional content.

Subsequently, the placement position determining section determines a time slot for the additional content on the basis of the time slot determining procedure information of the reference content identified by the reference content identifying section.

Accordingly, it becomes possible to decide a time slot for the additional content on the basis of the time slot determining procedure information of the reference content related to the additional content the user wants to add to the reproduction schedule and to schedule the additional content in that time slot.

Thus, once the additional content the user wants to add is determined, similarly to the aforementioned example, the additional content can be scheduled in a time slot near the closely related reference content in the reproduction schedule. Therefore, a reproduction schedule can be produced in which related pieces of content are scheduled together close to each other.

As a result, it becomes possible to produce an optimal, convenient reproduction schedule to the user according to which the user can collectively view related content.

Another content processing device in accordance with the present invention, to achieve the objective, is characterized in that it is a content processing device for managing a reproduction schedule specifying time slots in which content is reproduced, each piece of content being associated with content information indicating an attribute of the piece of content, to determine, on the basis of reference content scheduled in a time slot in the reproduction schedule, additional content newly added to a predetermined time slot in the reproduction schedule, the device including: a reference content identifying section for identifying reference content which corresponds to the predetermined time slot on the basis of content search information indicating association between a time slot in the reproduction schedule and content, associated with that time slot, which is scheduled in the reproduction schedule; and an additional content extracting section for identifying, as the additional content, content associated with content information which meets conditions determined on the basis of content information of the reference content identified by the reference content identifying section.

Another content processing method in accordance with the present invention, to achieve the objective, is characterized in that it is a content processing method implemented by a content processing device for managing a reproduction schedule specifying time slots in which content is reproduced, each piece of content being associated with content information indicating an attribute of the piece of content, to determine, on the basis of reference content scheduled in a time slot in the reproduction schedule, additional content newly added to a predetermined time slot in the reproduction schedule, the method including the steps of: (a) identifying reference content which corresponds to the predetermined time slot on the basis of content search information indicating association between a time slot in the reproduction schedule and content, associated with that time slot, which is scheduled in the reproduction schedule; and (b) identifying, as the additional content, content associated with content information which meets conditions determined on the basis of content information of the reference content identified in step (a).

According to the configuration, the reference content identifying section identifies, as the reference content, content associated with a predetermined time slot to which whatever additional content is to be added, on the basis of content search information recorded in advance indicating association between content and a time slot (for additional content). The content information of the identified reference content is used to identify the additional content.

Subsequently, the additional content extracting section identifies, as the additional content, content having content information which meets conditions determined on the basis of the content information of the identified reference content.

In other words, when whatever additional content is to be added to a predetermined time slot, to identify the additional content, first, reference content corresponding to the predetermined time slot is identified, and additional content related to the reference content is identified. Therefore, it becomes possible to schedule additional content related to the obtained reference content in the predetermined time slot.

Thus, a reproduction schedule can be produced in which closely related pieces of content are scheduled close to each other.

As a result, it becomes possible to produce an optimal, convenient reproduction schedule to the user according to which the user can collectively view related content.

For a fuller understanding of the nature and advantages of the invention, reference should be made to the ensuing detailed description taken in conjunction with the accompanying drawings.

BRIEF DESCRIPTION OF THE DRAWINGS

FIG. 3 is an illustration showing an example of the content contained in a content storage and the content information contained in a content information storage.

FIG. 4 is an illustration showing an example of placement position information contained in a location information storage.

FIG. 5 is an illustration showing an example of a reproduction schedule contained in a reproduction schedule storage.

FIG. 9 is an illustration placement positions in a reproduction schedule contained in a reproduction schedule storage.

FIG. 10 is an illustration showing another example of a reproduction schedule contained in the reproduction schedule storage.

FIG. 11 is an illustration showing an example of a revised reproduction schedule contained in the reproduction schedule storage.

FIG. 12 is an illustration showing another example of an association table depicting the reference content and the location determining procedure information contained in the location information storage.

FIG. 16 is an illustration showing an example of content search information contained in a location information storage.

FIG. 19 is an illustration an example of a displayed reproduction schedule showing additional content near reference content.

DESCRIPTION OF THE EMBODIMENTS

Figure 1:
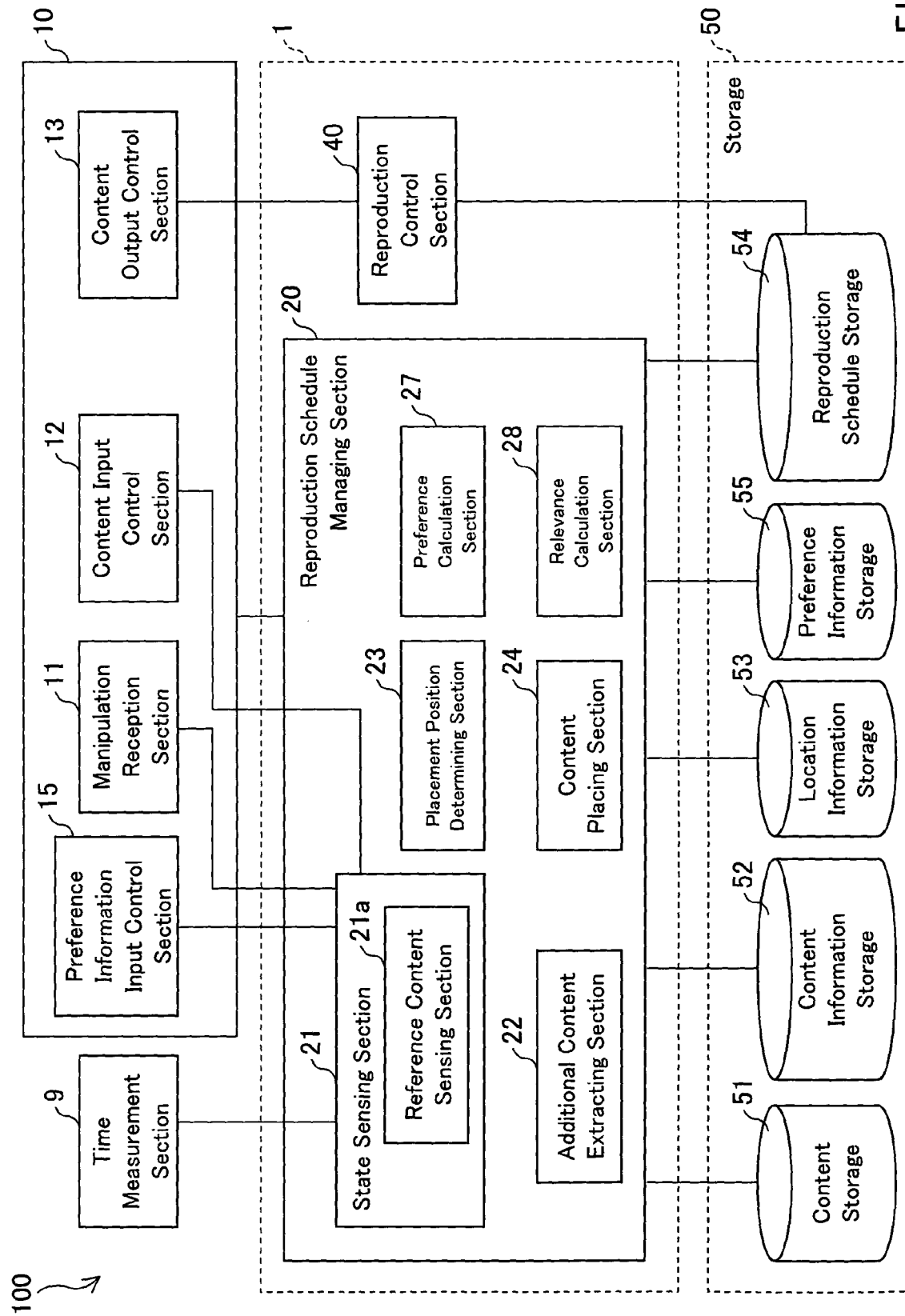
FIG. 1 is a block diagram illustrating the configuration of a major part of a digital television in accordance with an embodiment of the present invention.

The following will describe an embodiment of the invention with reference to FIG. 1 to FIG. 20.

In the present embodiment, a content processing device in accordance with the present invention is applied to a digital television which receives terrestrial digital broadcasting as an example.

In the figures referred to in the following description, the same members are indicated by the same reference numerals. The same members also share the same names and functions. Their detailed description will not be repeated.

Embodiment 1

(Overview of Digital Television 100 (200, 300))

Figure 2:
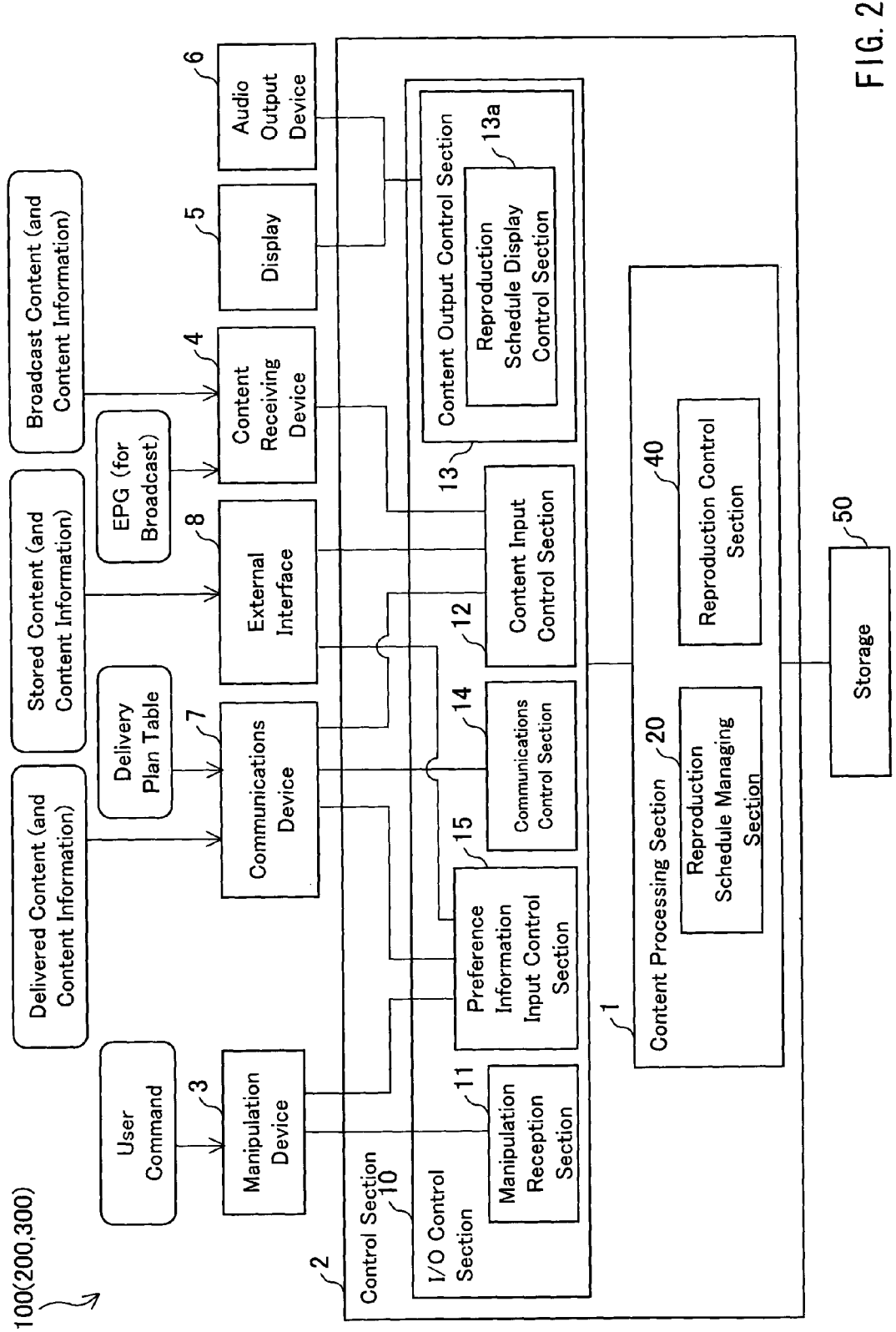
FIG. 2 is a block diagram schematically illustrating the configuration of a digital television in accordance with the present embodiment.

FIG. 2 is a schematic block diagram illustrating the configuration of a digital television 100 (200, 300) in accordance with the present invention. The overview of the digital television 100 given below is equally applicable to the digital television 200 and the digital-television 300.

The digital television 100 includes, as shown in FIG. 2, a control section 2, an manipulation device 3, a content receiving device 4, a display 5, an audio output device 6, a communications device 7, an external interface 8, and a storage 50.

The storage 50 contains programs executed by the control section 2 and various data for retrieval by the control section 2 in content management and reproduction control. Details of the control section 2 and the storage 50 will be given later.

The manipulation device 3 is signal input means through which a user inputs signals to operate the digital television 100. In the present embodiment, the device 3 is for example a remote controller for remote manipulation, physically separately from the digital television 100, or alternatively manipulation buttons built in the digital television 100. If the manipulation device 3 is a remote controller, the digital television 100 includes light receiving means (not shown) which, on the receiving end (light-receiving section end), receive command signals (for example, infrared signals) generated from key manipulation on the manipulation device (remote controller) 3. The command signals received by the light receiving means are sent to the control section 2.

The commands entered by the user through the manipulation device 3 for content processing include content reproduction commands, record commands, reproduction schedule update commands, and display commands. Another such command, if the content is realized by bidirectional communications, would be a purchase command which the user issues while content is being reproduced so that he/she can purchase the commercial goods presented in the content, for example. Further examples would include content reproduction manipulation commands, such as fast forward, rewind, and stop.

The content receiving device 4 receives content (program) transmitted on broadcast signals from broadcast stations (hereinafter, "broadcast content"). In a case like this, the content receiving device 4 includes a tuner, a demodulator section, a TS (transport stream) decoder, etc. The content receiving device 4 may also receive various information on the broadcast content (hereinafter, "content information"). The device 4 may also receive data for an electronic program table of broadcast content indicating times, channels, etc. of broadcast content.

After demodulation and decoding, the broadcast content, the content information, and the data for an electronic program table for broadcast content are stored in the storage 50. Content information will be detailed later.

The communications device 7 receives content delivered from an external device over a wireless or wired communications network constituted by the Internet, an LAN (local area network), etc. There are by no means any particular limitations as to how the content must be delivered. For example, the device 7 may receive content delivered by a multicast scheme whereby the same content data is transmitted to a multiple specified recipients. Alternatively, the device 7 may receive content delivered by a broadcast scheme whereby the same content data is transmitted to a multiple unspecified recipients. The communications device 7 may also receive content information on the delivered content. The device 7 may also receive data for a delivery plan table to display a list of delivery times and providers of delivered content.

The delivered content, the content information on that content, and the data for a delivery plan table are stored in the storage 50.

The external interface 8 reads data from an external storage and a storage medium to retrieve stored content contained in the storage and storage medium. The interface 8 may retrieve content information on the stored content. If the external storage, the storage medium, or the like contains the aforementioned electronic program table for broadcast content or delivery plan table (collectively referred to as EPG if there is no particular need to distinguish between the tables), the interface 8 may retrieve the EPG. The retrieved stored content, content information, and EPG (electronic program guide) data are stored in the storage 50.

The various content obtained by the content receiving device 4, the communications device 7, and the external interface 8 may be not only television programs delivered via a wire or wirelessly and video-centered content stored in a storage medium, but also includes radio programs and music-centered content such as music provided in a similar manner. The broadcast content, delivered content, and stored content will be collectively and simply referred to as content if there is no particular need to distinguish between the various kinds of content.

In other words, the "content" in this description refers to general multimedia content provided in various forms through various media including broadcast and communications networks.

Content and content information are associated with each other. In the example shown in FIG. 1, content and corresponding content information are input together. However, this is not limiting. Content and content information may be input separately. In a case like this, information indicating a relationship between content and content information is added to both the content and the content information. Since the relationship is not ambiguous, the content and the content information can be associated for storage in the storage 50 even if they are input separately.

The display 5 outputs video (moving image, still images) data in the content. The display 5 may be, for example, a display, such as an LCD (liquid crystal display), a PDP (plasma display panel), or a CRT (cathode-ray tube). The audio output device 6 may be a speaker outputting audio data in the content.

The control section 2 controls the entire operation of the digital television 100. The control section 2 retrieves various computer programs from the storage 50 in order to control the sections and members realizing the functions of a content processing device in accordance with the present invention and perform content management, produce reproduction schedules, and control content reproduction. The control section 2 includes inside thereof an input/output control section 10 and a content processing section 1.

The input/output control section 10 in the control section 2 controls information input/output between those sections in the digital television 100 (manipulation device 3, content receiving device 4, display 5, audio output device 6, and communications device 7, and external interface 8) and the content processing section 1 in the control section 2. The input/output control section 10 includes a manipulation reception section 11, a content input control section 12, a content output control section 13, a communications control section 14, and a preference information input control section 15.

The manipulation reception section 11 receives user manipulation command signals for the content which are input by the user through the manipulation device 3 and sends the signals to the content processing section 1. Accordingly, the digital television 100 is able to execute a process on specified content and produce a reproduction schedule in accordance with the user manipulation.

The manipulation reception section 11 may receive a timer recording command, as the user manipulation command, to record content planned for broadcast (delivered) according to the EPG. In a case like this, a timer recording reception section (not shown) in the content processing section 1 executes a timer recording process on the content specified by the user. For example, if the user wants to set up timer recording for content will be broadcast, the timer recording reception section receives the date, starting time, ending time, channel, title of the content, and other timer recording information which are needed in timer recording. The timer recording reception section then adds the information to a timer recording list contained in the storage 50.

The timer recording information may be input by none other than the user on the manipulation device 3. Alternatively, apparatus may automatically determine timer recording content for automatic timer recording. Apparatus may automatically determine timer recording content by an existing method.

Subsequently, a recording processing section (not shown) in the content processing section 1 performs a recording process for content on the basis of the timer recording list processed by the timer recording reception section. The content recorded by the recording processing section is stored as stored content in the storage 50.

The content input control section 12 receives the content, the content information, and the EPG data received by the content receiving device 4, the communications device 7, and the external interface 8 and stores the incoming data into the storage 50.

When the content processing section 1 reproduces the stored content contained in the storage 50 or the receive broadcast content (delivered content), the content output control section 13 outputs video data in the content to the display 5 and/or audio data to the audio output device 6. Accordingly, the user can enjoy the video content displayed on the display 5 and the music content output from the audio output device 6.

The content output control section 13 may output a receive EPG or a produced reproduction schedule on the display 5.

The communications control section 14 controls communications between the digital television 100 and external devices. Specifically, for example, when the section 14 has received from the user a command to download distributed content, the section 14 controls the communications device 7 to obtain the content.

The preference information input control section 15 receives the input of data related to user preference information. Preference information may be any information on user preference: for example, information on favorite categories and information viewing frequency for each piece of content (for each particular kind of content). The preference information may be input by none other than the user on the manipulation device 3. Alternatively, other external apparatus may collect or calculate preference information for input. Alternatively, the preference information may be fabricated as preference information by a preference information processing section (not shown) in the content processing section 1 on the basis of input (and history thereof) of use commands for processing content entered through the manipulation device 3 and stored in the storage 50.

The content processing section 1 in the control section 2 receives, via the input/output control section 10, user command signals entered through the manipulation device 3 and the content obtain from the content receiving device 4, etc. to execute various processing (e.g., produce a reproduction schedule) on the content. The content processing section 1 includes therein a reproduction schedule managing section 20 and a reproduction control section 40 in order to realize a content processing device in accordance with the present invention in the digital television 100, that is, to produce an optimal schedule for the user.

The reproduction schedule managing section 20 manages a reproduction schedule specifying, for example, the time when content reproduction is started and the channel so that the stored content contained in the storage 50 and the broadcast (delivered) content shown in an EPG are reproduced in a suited manner. The reproduction control section 40 reproduces predetermined piece of content in response to user manipulation or based on the reproduction schedule generated by the reproduction schedule managing section 20.

The following will describe the storage 50 and the members and sections in the content processing section 1 in further detail.

(Configuration of Digital Television 100)

FIG. 1 is a block diagram illustrating the configuration of a major part of the reproduction schedule managing section 20 in the digital television 100 in accordance with the present embodiment. As shown in FIG. 1, the reproduction schedule managing section 20 includes inside thereof a state sensing section 21, an additional content extracting section 22, a placement position determining section 23, and a content placing section 24. The storage 50 includes a content storage 51, a content information storage 52, a location information storage 53, a reproduction schedule storage 54, and a preference information storage 55.

The state sensing section 21 monitors the state of the digital television 100. The section 21 senses a predetermined state to determine whether to execute a process of generating a new reproduction schedule or a process of revising a generated reproduction schedule (hereinafter, referred to collectively as a reproduction schedule production process).

Examples of the predetermined state sensed by the state sensing section 21 would include a state where a process execution command signal for a reproduction schedule production process has been received.

For example, a possible case is that the digital television 100 includes a time measurement section 9 and time measurement section 9 sends the command signal to the state sensing section 21 at a fixed interval (for example, every 2 hours). Two hours after the time measurement section 9 started time measurement (after the previous reproduction schedule production process ended), a process execution command signal instructing an execution of a reproduction schedule production process is sent to the state sensing section 21. In addition, the reproduction schedule may be produced at a predetermined time.

Alternatively, the state sensing section 21 may sense a state where the process execution command signal has been entered by the user through the manipulation device 3 to the manipulation reception section 11.

Further, if the content with higher importance, in other words, the content which should be presented to the user, among the various content managed by the content storage 51 is managed anew, and the content is not included in the reproduction schedule, it may be decided that the reproduction schedule is revised. This is intended to, based on a determination that content with high importance should be presented to the user, add the content to the reproduction schedule and revise the reproduction schedule so that the schedule is optimal to the user. The importance of each piece of content may be calculated in any manner; for example, the importance may be user preference about the content. Alternatively, content containing current topics may be given high importance.

Alternatively, when an EPG, such as an electronic program table for broadcast content or a delivery plan table, is received, user preference may be calculated for the content given by the EPG. If the EPG includes content which does not match user preference, it may be decided to produce a reproduction schedule.

These configurations enable the state sensing section 21 to determine to execute the reproduction schedule production process.

The state that can be sensed by the state sensing section 21 is not limited to the above examples; various other states are possible. For example, a state where the content•input control section 12 has received new content, content information, or an EPG may be sensed. A state where the preference information input control section 15 has received input of data related to preference information may be sensed.

Further, in the present embodiment, the state sensing section 21 includes a reference content sensing section 21a. The reference content sensing section 21a senses reference content in the various content managed by the content storage 51 or included in the reproduction schedule.

The reference content is content giving guidelines for the reproduction schedule production process. It is decided which piece of content should be added to which part of the reproduction schedule, on the basis of the substance of the reference content, the content information of the reference content, etc.

The reference content sensing section 21a may sense the reference content in any manner. For example, if the state sensing section 21 determines to start the reproduction schedule production process, the section 21a may sense the content set up in advance in the storage 50 as the reference content. Alternatively, the section 21a may randomly select a piece of content from all the content managed by the content storage 51. In addition, user preference may be calculated for all content so that the content given the highest preference can be sensed as the reference content.

In addition, when a command for a reproduction schedule production process is received from the user, a command signal which specifies reference content may be received, and that reference content may be recognized as the reference content.

The additional content extracting section 22 extracts, from the content storage 51 on the basis of the information on the reference content, the content which should be included (added) to the reproduction schedule (hereinafter, "additional content"). In other words, the additional content extracting section 22 decides on the basis of the reference content which content to add to the reproduction schedule.

In the present embodiment, specifically, suitable additional content is extracted on the basis of a content ID of the reference content sensed by the reference content sensing section 21a, using the content information of the reference content stored in the content information storage 52. The method of extracting the additional content will be detailed later.

If the additional content extracted by the additional content extracting section 22 from the content storage 51 is not stored content, but delivered content, the additional content extracting section 22 may instructs the communications control section 14 to obtain the delivered content so that the communications device 7 obtains the instructed delivered content.

The placement position determining section 23 decides a placement position (time slot) for the additional content on the basis of the information on the reference content. That is, the section 23 decides that in which part of the reproduction schedule (which time slot, which channel, etc.) the additional content should be included on the basis of the reference content.

In the present embodiment, specifically, the suitable placement position of the additional content is decided on the basis of a content ID of the reference content sensed by the reference content sensing section 21a, using the placement position information stored in the location information storage 53 which is specified in the reference content. The method of deciding the placement position will be detailed later.

The content placing section 24 places the additional content extracted by the additional content extracting section 22 to the placement position determined by the placement position determining section 23. For example, suppose that the additional content extracting section 22 has extracted as the additional content stored content, "content A" stored in the content storage 51 and that the placement position determining section 23 has decided "19:00 to 19:30 on channel 2" as the placement position. In a case like this, the content placing section 24 places "content A" in "19:00 to 19:30 on channel 2."

The reproduction schedule produce as above is stored in the reproduction schedule storage 54. The content output control section 13 retrieves the reproduction schedule from the reproduction schedule storage 54 for output to the display 5, the communications device 7, or the external interface 8. The reproduction schedule output to the display 5 is viewed by the user.

Meanwhile, the reproduction control section 40 refers to the reproduction schedule in the reproduction schedule storage 54 retrieves predetermined content at predetermined times as indicated in the reproduction schedule to feed the content output control section 13.

The digital television 100 in accordance with the present invention may further include a preference calculation section 27 and/or a relevance calculation section 28 inside the reproduction schedule managing section 20.

The preference calculation section 27 calculates preference which represents user preferences for content. The preference calculation section 27 calculates preference for each piece of content.

In the present embodiment, the content preference is calculated using the content information of each piece of content, the EPG (content information storage 52), and the preference information (preference information storage 55). The preference calculation section 27 may well calculate preference by an existing method (calculation/conversion formula); any method can be used provided that the resultant preference represents quantitatively how well the content matches a user preference. The preference is used when priority needs be given to multiple pieces of content and when a particular piece of content needs be selected from multiple pieces of content, for example.

The relevance calculation section 28 calculates relevance (degree of relation) which represents a degree of relation between two pieces of content. The relevance calculation section 28 calculates relevance for each combination of two pieces of content.

The relevance is an indicator representing relationship between two pieces of content. The relevance is high for pieces of content which are closely related to each other and low for pieces of content which are remotely related to each other.

In the present embodiment, it is assumed that the relevance calculation section 28 calculates relevance for content on the basis of items of content information stored in the content information storage 52. The relevance may be calculated in any manner. There are no particular limitations on the calculation/conversion formula.

For example, since, like in a drama program consisting of multiple episode, both "Episode II" of "drama A" and "Episode III" of "drama A" are content related to the same "drama A," their relevance is high. Animation content and an advertisement for commercial goods involving a cartoon character of the animation content are content related to the same animation content; their relevance is high. Further, content in which the same person appears and content belonging to the same category also have high relevance.

Next, the content stored in the content storage 51 and the content information of the content stored in the content information storage 52 will be described.

The content storage 51 stores reproduced content. The content storage 51 stores recorded content recorded by a recording processing section and delivered content obtained in advance by the communications device 7. Each stored content is assigned a content ID which uniquely identifies the piece of content. Reproduced content is specified on the basis of the content ID, and the content to be included in the reproduction schedule is identified.

The content information storage 52 stores the stored content stored in the content storage 51 and the content information of broadcast (delivered) content indicated in an obtained EPG as being planned for broadcast (delivery).

Content information is information on content. The content information includes, for example, items, such as broadcast (delivery) starting and ending date and time of the content, channel, title of the content, information on personalities in the content, content substance, key word information, and series information (if the content consists of episodes). This content information is extracted from the EPG. A user-defined item may be added as a new item of content information to receive an input of content information.

The items of content information are not limited to the above examples. Any information can be used provided that it is relevant to the content. Other examples include medium type (video, audio, etc.), extended content information, copy control information, categories, viewer restrictions by means of age, subtitle information, additional program information (information that an interruption is likely), paid program information, etc.

In the present embodiment, the content information of all kinds of content is managed together. However, this is not limiting. The content information storage 52 may separately contain a content list (table A) for stored content, an electronic program table for broadcast content provided by each broadcast station (table B), and a delivery plan table (table C) provided by a content deliver. However, in a case like this, tables A to C may not always include the same items of content information; various content may well be managed using basic items (for example, broadcast (delivered) starting time, content title, etc.) of the content information, which are common to all the tables.

In other words, the content storage 51 and the content information storage 52 may have any data structure provided that various content (stored content, broadcast content, and delivered content) is stored in association with content information of each piece of content managed by the content information storage 52.

Therefore, the example shown in FIG. 1 indicates that the content storage 51 and the content information storage 52 are separately stored, but is not limited to this. A single storage may collectively record and manage the content information contained in the stored content and the EPG.

FIG. 3 is an illustration showing an example of the content stored in the content storage 51 and the content information contained in the content information storage 52. In the example shown in FIG. 3, the association between the content and the content information is shown in the table structure, but is not limited to this. The association may be shown in a list format.

Column 131 shows "content IDs" with which to uniquely identify a piece of content. In the present embodiment, IDs are assigned so that no same IDs are given to different pieces of content even if they are of different kinds. Therefore, all pieces of the content are manageable using the IDs alone, to no matter which kinds of content the pieces belong.

Column 132 shows "media types" of content. For example, "Stored" indicates that the content is stored content contained in the content storage 51. "Broadcast" indicates that the content is broadcast content which is planned for broadcast in the near future.

Column group 133 indicates the "source" of content. If the stored content is recorded content stored in the content storage 51, the column may contain the address of the area where the content is stored. If the kind of the stored content is broadcast content, the column may contain the channel information for the broadcast station supplying the broadcast content. If the kind of the stored content is delivered content, the column may contain the IP address of the content deliver server delivering the delivered content.

Column group 134 indicates content information of content. The content information shown in FIG. 3 is used to calculate preference for each piece of content and to calculate relevance between individual pieces of content.

The content information shown in FIG. 3 (e.g., title, information on personalities, content substance, key words) are mere examples, and is by no means limited to this. The information given in the EPG obtained by the digital television 100 may be used as content information.

The location information storage 53 stores placement position information indicating information to decide a placement position for the additional content extracted on the basis of the reference content.

Placement position information indicates association between the reference content and location determining procedure information (time slot determining procedure information) specifying procedures to determine a placement position for the additional content. The placement position information is information necessary to identify a place and channel (time slot and channel) to place additional content in a reproduction schedule.

The placement position determining section 23 refers to the placement position information in the location information storage 53 and determines a placement position for the additional content in accordance with the procedures indicated in the location determining procedure information associated with the reference content.

FIG. 4 is an illustration showing an example of the placement position information stored in the location information storage 53. In the present embodiment, the placement position information includes a location determining procedure list 141 and a content-procedure association table 142.

First, the location determining procedure list 141 contains the location determining procedure information. In the present embodiment, the list 141 uniquely identifies multiple sets of location determining procedure information described below by the item, "Procedure Code," for management.

The placement position of the additional content is determined by placement position determining section 23 on the basis of the reference content. The placement position determining procedures specified by the location determining procedure information fall in either of the following two major categories, depending on whether the reproduction (planned) time information of the reference content is used or not.

(Procedure 1) Temporal Proximity

The first method utilizes reproduction time information of the reference content to determine a placement position for the additional content. For example, the location determining procedure information may be "place additional content immediately before (or immediately after) reference content is reproduce," "n hours before and after reference content reproduction time," or "from k hours to k+1 hours after reference content ending time." Alternatively, no time slot is specified; a point in time may be specified instead, e.g., "seven days before (one day before, one day after, three hours before) the reproduction of the reference content is started (ended)."

(Procedure 2) Overwrite Specified Target

The second method considers, in addition to the content information of the reference content, the substance, content information, etc. of the content which is already included in the reproduction schedule in determining a placement position for the additional content. For example, the location determining procedure information may be, for example, "place additional content at a location where content with lower preference than the reference content is located" or "place additional content at a location where content with the lowest relevance to the reference content is located."

The location determining procedure information defined in advance is stored as a list like the location determining procedure list 141 shown in FIG. 4 in the location information storage 53, for example.

Next, the content-procedure association table 142 stores the association between the reference content and the location determining procedure information. The placement position determining section 23 refers to the content-procedure association table 142 to identify location determining procedure information on the basis of the reference content. The placement position determining section 23 can decide a placement position in accordance with the procedure specified by the identified location determining procedure information.

In the example shown in FIG. 4, the item, "Procedure Code," is an identifier with which the defined location determining procedure information is uniquely identified. The placement position determining section 23 identifies a procedure code for the reference content from the content-procedure association table 142 to recognize the placement position of the additional content. Item 1 indicates whether the location determining procedure information will refer to the reproduction (planned) time information of the reference content. The placement position determining section 23 can determine that, for example, if the item contains "1," the placement position is determined by procedure 1 above and that if the item contains "0," the placement position is determined by procedure 2.

Items 2 and 3 specifies further details as to the placement position determining procedure in the foregoing procedures. In the present embodiment, for example, when item 1 is "0," the placement position is determined using preference if items 2 and 3 are "0, – (null)." If items 2 and 3 are "1, –," the placement position is determined using relevance. In contrast, when item 1 is "1," the location immediately before the reference content is determined as the placement position if items 2 and 3 are "0, 1." If items 2 and 3 are "1, 0," the location immediately after is determined as the placement position. When items 2 and 3 are "1, 1," the placement position is determined by specifying a time slot, and the specified time slot is stored in items 4 and 5. Further, when items 2 and 3 are "0, 0" the placement position is determined on the basis of the information specifying the point in time contained in item 6.

The placement position information described here is a mere example and not limited to this. For example, the item, "Procedure Code," may not be provide with constructing the location determining procedure list 141 and the content-procedure association table 142 as a single table. In other words, the placement position information may have any data structure provided that each piece of reference content is associated with an individual set of location determining procedure information. In addition, the placement position information may not be necessarily provided in table format.

The aforementioned placement position information may be included in data for reference content or separately delivered to be obtained. In addition, the definition of the placement position information in the location determining procedure list 141 may be registered by the user.

The reproduction schedule storage 54 stores the reproduction schedule produced by the reproduction schedule managing section 20. The reproduction schedule specifies reproduction starting times and channels of content so that the stored content contained in the storage 50 and the broadcast (delivered) content listed in the EPG is reproduced in a suitable manner.

FIG. 5 is an illustration of an example of the reproduction schedule. FIG. 5 shows not the whole reproduction schedule, but the display example of the reproduction schedule produced on the display 5 for user viewing.

The reproduction schedule in accordance with the present embodiment, as shown in FIG. 5, has a format in which the vertical axis shows time information and the horizontal axis shows channel information. Column 151 shows time information. Columns 152 and 153 are produced from EPG data and show a broadcast schedule of broadcast content (or delivery schedule of delivered content). Column 154 shows a local channel, that is, a stored content reproduction schedule. The display format of the reproduction schedule shown in FIG. 5 is a mere example for the purpose of description and by no means limiting the display format of the reproduction schedule of the present invention.

There are no particular limitations on the data structure of the reproduction schedule stored in the reproduction schedule storage 54. Any data structure is possible provided that reproduction starting (ending) times, a channel, and other information is stored in association with of each piece of content so that the various content managed by the content information storage 52 is reproduced in a suitable manner.

The preference information storage 55 stores preference information entered through the preference information input control section 15. For example, the user enters in advance his/her favorite categories, channels he/she often watches, and favorite actors/actresses/sports players, and other information through the manipulation device 3 to store in the preference information storage 55. Alternatively, viewing frequencies may be stored for each category or each piece of content in accordance with a timer recording command and a channel selection command to view broadcast content from the user.

(Reproduction Schedule Production Process Flow 1)

Next, the steps of a reproduction schedule production process executed by the reproduction schedule managing section 20 using the aforementioned various information contained in the storage 50 will be described.

Figure 6:
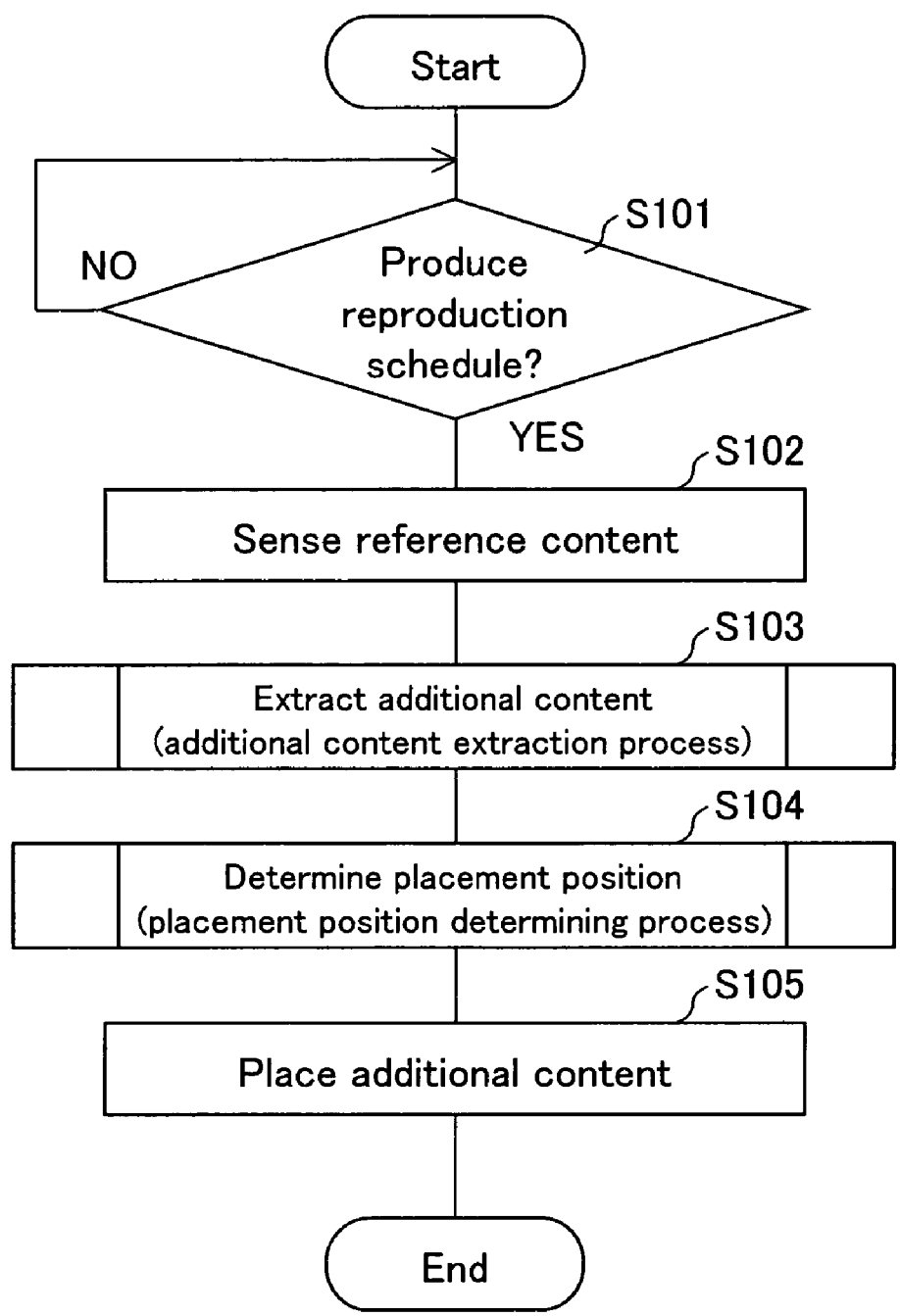
FIG. 6 is a flow chart illustrating the steps of a reproduction schedule production process in a digital television in accordance with the present embodiment.

FIG. 6 is a flow chart illustrating the steps of the reproduction schedule production process in the reproduction schedule managing section 20.

First, the state sensing section 21 senses a predetermined state of the digital television 100 and determines to execute the reproduction schedule production process (S101). We assume here that the user has specified reference content through the manipulation device 3 as the manipulation by which is sent a command which instructs the execution of the reproduction schedule production process.

Next, the reference content sensing section 21a senses the reference content specified by the user the content contained in the content storage 51 (S102). We assume here that "content G-2" (see FIG. 5) has been selected as the reference content.

This is by no means limiting how the reference content sensing section 21a senses the reference content. For example, the reference content may be sensed on the basis of user preference of content. The preference calculation section 27 calculates user preferences for various content managed by the content storage 51. Accordingly, the reference content sensing section 21a can determine the content with the highest preference as the reference content.

The content with the highest preference is the content that best matches user preferences and can be regarded as most likely to be viewed by the user. Therefore, it becomes possible to place content related to the reference content with the highest preference in close temporal proximity of the reference content as additional content. This allows the user to produce a more suitable reproduction schedule. In addition, to the content provider, placing the content related to the reference content in close temporal proximity of the content which will be likely to be viewed by the user produces a more suitable reproduction schedule because of, for example, better advertisement effect.

Next, the additional content extracting section 22 processes the extraction of the additional content on the basis of the content information of the reference content sensed by the reference content sensing section 21a (S103). The additional content extraction process will be detailed later.

Subsequently, the placement position determining section 23 determines a placement position for the additional content reproduction schedule on the basis of the content information of the reference content (S104). The placement position determining process will be detailed later.

Finally, the content placing section 24 places the additional content extracted by the additional content extracting section 22 at the placement position determined in S104 to produce a reproduction schedule (S105) to store it in the reproduction schedule storage 54.

(Additional Content Extraction Process)

Figure 7:
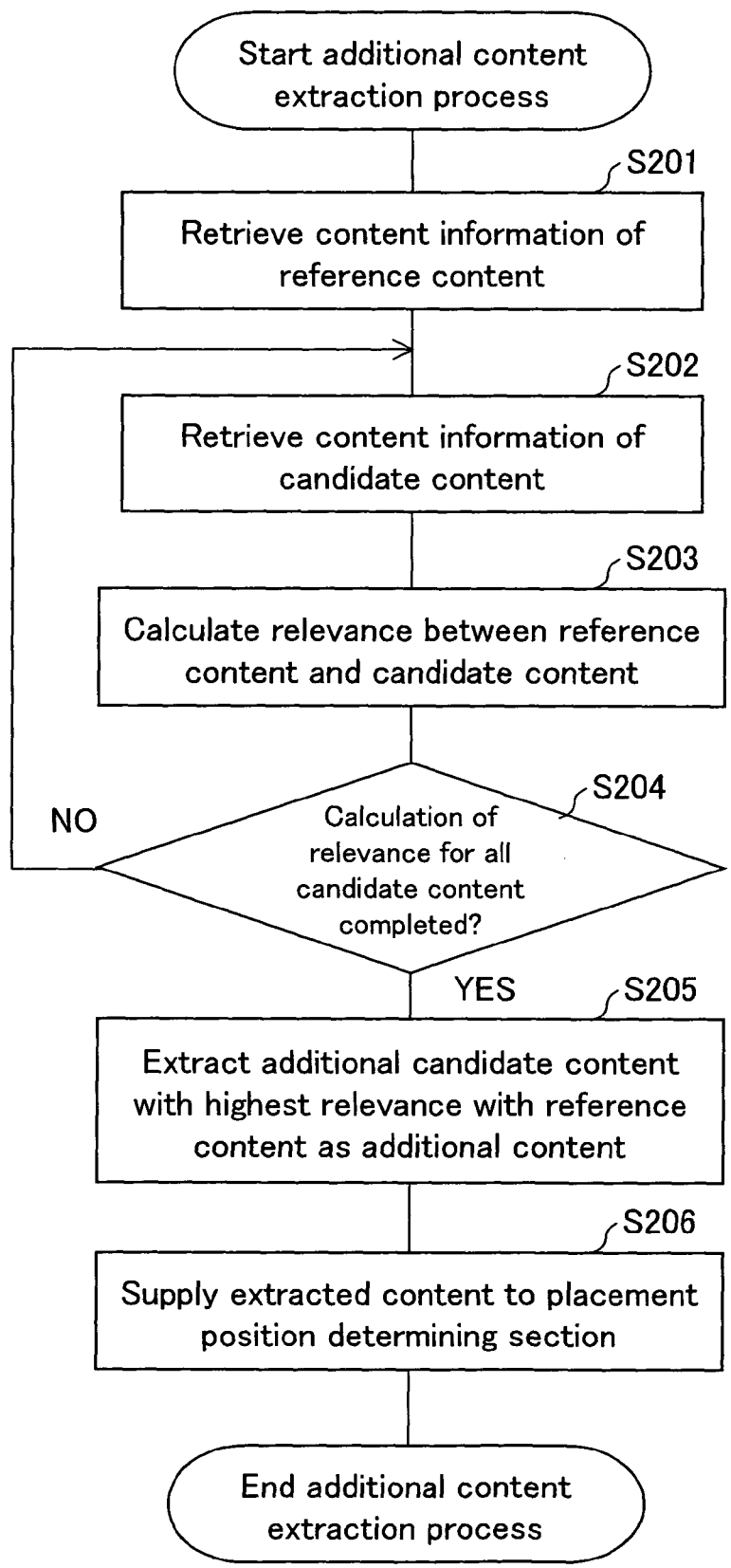
FIG. 7 is a flow chart illustrating the steps of an additional content extraction process in an additional content extracting section in a digital television of the present invention.

Next, the additional content extraction process in S103 will be described in detail. FIG. 7 is a flow chart illustrating steps in the additional content extraction process in the additional content extracting section 22.

The present embodiment will describe the additional content being extracted using the aforementioned relevance calculated by the relevance calculation section 28 as an example.

The relevance calculation section 28, first, retrieves form the content information storage 52 the content information of "content G-2" which is the reference content identified in S102 (S201). Next, the relevance calculation section 28 calculates respective relevance between the reference content, "content G-2," and each piece of content managed by the content storage 51. All the content managed by the content storage 51 is regarded as being candidate content which can be extracted as the additional content, and the content information of each piece of candidate content is retrieved to calculate the relevance from the reference content (S202). However, this is not the only possibility; candidate content may be narrowed down on the basis of predetermined conditions to calculate relevance for only the candidate content which meets the conditions. Alternatively, only the content that is in a certain time slot of the EPG may be considered to calculate relevance for that candidate content. For example, relevance may be calculated for the content which is in a time slot in which the user often views. We assume here that five pieces of content, "content A-2," "content G-1," "content H-2," "content K-3," and "content L-7," (see FIG. 3) have been selected as candidate content on the basis of certain conditions.

The relevance calculation section 28 compares the content information of the reference content and that of the five pieces of candidate content to calculate the relevance between the content (S203).

A possible method of calculating the relevance is to calculate based on the number of common items contained in the content information of the content. More specifically, taking the example shown in FIG. 3, the relevance is calculated on the basis of questions, such as, 'Does the item, "Content Title," match (is a common word found)?,' 'Do the names under the item, "personalities," match?,' 'Does the item, "key word," contain common a key word?,' and 'Does the item, "category," match?,' so that the result is greater as the information of the content contains more common or matched information. Further, the relevance may be calculated from the number of matched words found in results of morpheme analysis of synopsis of the content under the item, "program substance." Further, if the content-identifying "content ID" includes data which indicates a content group, two or more pieces of content with IDs which have a large common part may be regarded as the content related to each other so that the relevance for the two pieces may be high.

More specifically, for example, relevance is high between episodes of a "series" programs, such as a drama. In addition, relevance is high between mail order program content and advertisement content which promote the same commercial goods.

As the relevance calculation section 28 calculates relevance for all the five pieces of content which are candidate content in this manner (YES in S204), the additional content extracting section 22 extracts a candidate content which has the highest relevance with the reference content as the additional content (S205). We assume here that among the five pieces of content, "content G-1," has the highest relevance. Therefore, the additional content, "content G-1," is extracted on the basis of the content information of the reference content, "content G-2."

Finally, the additional content extracting section 22 supplies the information of the extracted additional content, "content G-1" (for example, the content ID, "ID012," of "content G-1") to the placement position determining section 23 (S206), thereby ending the additional content extraction process.

(Placement Position Determining Process)

Figure 8:
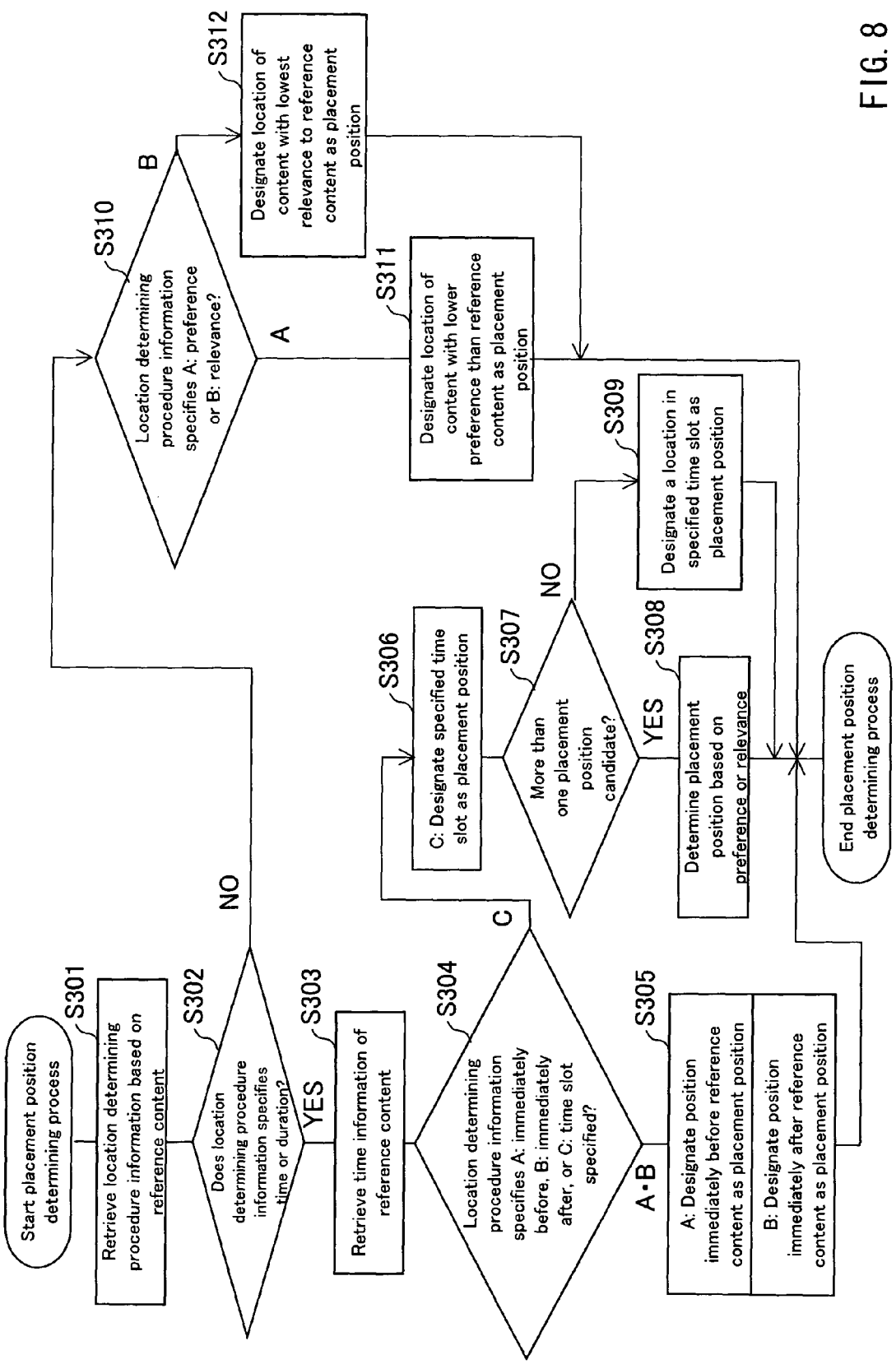
FIG. 8 is a flow chart illustrating the steps of a placement position determining process in a placement position determining section in a digital television of the present invention.

Next, the placement position determining process in S104 (FIG. 6) will be described in detail. FIG. 8 is a flow chart illustrating steps in the placement position determining process in the placement position determining section 23.

The present embodiment will describe the placement position determining section 23 referring to the placement position information shown in FIG. 4 to determine a placement position for additional content in a reproduction schedule, as an example. The placement position determining section 23 determines, on the basis of the location determining procedure information of the reference content, a placement position in the reproduction schedule for the additional content extracted in the additional content extraction process.

First, the placement position determining section 23 refers to the content-procedure association table 142 (FIG. 4) for the location information storage 53 to retrieves the location determining procedure information of the reference content, "content G-2" (S301). As shown in FIG. 4, "ID013" (from FIG. 3) of the reference content, "content G-2," is associated with procedure code, "A03," which is the location determining procedure information. Therefore, in this example, items, "1, 0, 1, -, -, -," in the location determining procedure information are retrieved from the location determining procedure list 141.

The placement position determining section 23 analyzes the retrieved location determining procedure information in S302 and succeeding steps to decide a placement position on the basis of results of the analysis. First, item 1 is verified to determine whether the location determining procedure information is location determining procedure information which specifies a time or duration (S302). If item 1 is "1" (YES in S302), the placement position determining section 23 refers to the content information storage 52 to retrieve information related to the duration (time information) of the reference content, "content G-2" (S303).

Next, items 2 and 3 are verified to determine which placement position determining procedure is specified by the location determining procedure information. If items 2 and 3 are "A: 0, 1" or "B: 1, 0" (A or B'in S304), the position immediately before the reference content is designated as the placement position for A, and the position immediately after the reference content is designated as the placement position for B (S305). In other words, for A, describing using the reproduction schedule shown in FIG. 9, the position of location L which is immediately before "content G-2" is designated as the placement position. For B, the position of location N which is immediately after "content G-2" is designated as the placement position.

Accordingly, the additional content, "content G-1," which is most related (which has the highest relevance) to the reference content, "content G-2," can be placed close to the reference content, to produce a reproduction schedule according to which the user can collectively view content of close relationship.

In contrast, if items 2 and 3 are "C:1,1" in S304, the placement position determining section 23 refers to items 4 and 5 to determine which time slot is specified in the reproduction schedule as the placement position (S306). Here, if the specified time slot includes multiple placement position candidates where content can be placed (YES in S307), the placement position determining section 23 identifies a placement position on the basis of the preference calculated by the preference calculation section 27 and the relevance calculated by the relevance calculation section 28. If the specified time slot has only one placement position where content can be placed (NO in S307), the location is determined as the placement position of the additional content (S309), thereby ending the placement position determining process.

The time slot may be specified as "n hours before and after the reproduction time of the reference content." Accordingly, the additional content, "content G-1," which is most related (which has the highest relevance) to the reference content, "content G-2," can be placed in temporal proximity to the reference content. Therefore, a reproduction schedule can be produced according to which the user can collectively view content of close relationship.

Next, a case where the location determining procedure information retrieved in S301 does not specify a duration will be described. If item 1 is "0" (NO in S302), the placement position determining section 23 verifies item 2 to determine whether the location determining procedure information specifies that the placement position should be decided on the basis of preference or relevance (S310).

If item 2 is "0" (A in S310), the placement position determining section 23 determines, as the placement position, a location where content with lower preference than the reference content is placed (S311). If there are placed multiple pieces of content with lower preference than the reference content, the piece of content that has the lowest preference among them may be identified. Accordingly, it becomes possible to place the additional content, "content G-1," which is related to the reference content in place of the content that has lower user preference than the reference content, "content G-2." Hence, a reproduction schedule can be produced according to which the user can exclude low preference content and collectively view the highly related content. Therefore, a more suitable reproduction schedule for the user can be maintained.

In contrast, if item 2 is "1" (B in S310), the location of the content with the lowest relevance with the reference content is designated as the placement position (S312). Accordingly, it becomes possible to place the additional content, "content G-1," which is related to the reference content in place of the content that is less related to the reference content, "content G-2." Hence, a reproduction schedule can be produced according to which the user can exclude content that is little related with the reference content and collectively view the closely related content.

If content with higher preference than the additional content, "content G-1," is already placed at the placement position determined in S312, the process may be suspended without placing additional content at the placement position. The suspension prevents the content with low user preference from being included in the schedule. Therefore, a more suitable reproduction schedule for the user can be maintained.

In the FIG. 8 example, in step S311, the placement position determining section 23 determines, as the placement position for the additional content, the placement position of content with lower preference than the referential content. This is however by no means limiting. For example, the placement position determining section 23 may determine, as the placement position for the additional content, the placement position of content with lower preference than a predetermined threshold value. The predetermined threshold value may be specified by the user to his/her liking or automatically according to, for example, the average preference for all content managed by the digital television 100.

Next, referring to the reproduction schedule shown in FIG. 5, an example will be described in which the additional content, "content G-1," is placed immediately before the reference content, "content G-2," in the aforementioned reproduction schedule production process involving S305.

As shown in FIG. 5, the additional content, "content G-1," is placed in temporal proximity of the reference content, "content G-2," that is, at location L (FIG. 9) immediately before the reproduction starting time of "content G-2." In the example shown in FIG. 5, although "content G-1" ends and "content G-2" starts at the same time, more or less temporal space may be provided therebetween.

Accordingly, after viewing "content G-1," the user can continue to view "content G-2." No break occurs before viewing "content G-2." For example, when "content G" is drama content consisting of episodes, "content G-2" is the second episode of the drama content, and "content G-1" is digest content of the first episode of the drama content, the user can view the second episode after viewing the digest of the first episode, making a smooth transition to the second episode, by placing "content G-1," which is digest content of the first episode, immediately before "content G-2."

In other words, if the digest content of drama content has been delivered to the user in advance, by presenting to the user a reproduction schedule including the digest content immediately before the sequence to that drama content is broadcast, the user can be reminded of the story of the last episode before starting to view the sequence.

The additional content, "content G-1," is placed immediately before the reference content, "content G-2." This is not the only possibility. For example, when the additional content is "content A-2," and the reference content is "content A-1," "content A-2" may be placed at location J (FIG. 9) immediately after "content A-1" as shown in FIG. 5. In addition, in FIG. 5, "content A-1" ends and "content A-2" starts at the same time, more or less temporal space may be provided therebetween.

Accordingly, after viewing "content A-1," the user can continue to view "content A-2." For example, when "content A-1" is animation content, and "content A-2" is advertisement content for toys and other goods based on a cartoon character in "content A-1," by placing "content A-2," which is advertisement content for those goods, immediately after "content A-1," the user can be informed of goods based on a cartoon character in "content A-1." Further, to goods manufacturers or the provider which provides "content A-2," since the user views "content A-2" immediately after viewing "content A-1," the goods leave distinct impression to the user, encouraging the user to purchase the goods.

In other words, if the advertisement content for goods based on a cartoon character in content has been delivered to the user in advance, by presenting to the user a reproduction schedule including the advertisement content for the goods immediately after the content is broadcast, the user can be informed of related goods. To the provider of the advertisement content, the placement encourages the user to purchase the goods.

Next, an example will be described in which additional content is placed, overwriting original content, by a reproduction schedule production process including S311 using the reproduction schedule shown in FIG. 10 and FIG. 11.

In the present embodiment, user preference is calculated for the content included in the 19:00-21:00 time slot in FIG. 10 as an example. That is, user preference is calculated for eight pieces of content: "content A-1," "content B-5," "content C-1," "content D-3,""content E-1," "content F-1," "content G-2," and "content H-1." Here, preference is quantified by 10 levels. The user preference is 9 for "content A-1" and "content G-2," 7 for "content B-5," "content C-1," and "content E-1," 4 for "content D-3," and 2 for "content F-1" and "content H-1."

The preference calculation section 27 extracts the content information of each piece of content from the content information storage 52 and extract user preference information from the preference information storage 55. The preference for content may be calculated with any existing method.

The placement position determining section 23 determines content to be overwritten from the preference calculated by the preference calculation section 27. Here, low-preference content found in temporal proximity of the reference content, "content G-2," is selected as the content to be overwritten.

The content with the lowest preference among the pieces of content calculated above is "content F-1" and "content H-1" with preference of 2. Here, we assume that further the relevance calculation section 28 calculates relevance from the reference content "content G-2" and that "content F-1" with lower relevance is designated as the content to be overwritten.

Next, the content placing section 24 places additional content "content G-1" to overwrite the target content "content F-1." An example of the reproduction schedule produced as a resultant is shown in FIG. 11.

FIG. 11 shows a reproduction schedule produced by placing additional content overwriting content in the reproduction schedule shown in FIG. 10. Here, "content G-1" is placed at the position of low-preference "content F-1" located in temporal proximity of the reference content, "content G-2."

As shown in FIG. 11, the user can view "content G-1" instead of "content F-1" on channel 2 starting at 20:00. The schedule is such that when the reproduction of "content G-1" ends, "content G-2" starts.

Accordingly, after viewing "content G-1," the user can continue to view "content G-2." No break occurs before viewing "content G-2." "Content G-1" and "content G-2" are related to each other, and it is desirable if the two pieces of content are viewed continuously. Therefore, it becomes possible to revise and maintain the optimal reproduction schedule to the user.

In the above example, the content with the lowest preference calculated by the preference calculation section 27 is designated as the content which will be overwritten. This is by no means limiting. For example, if there are provided a timer recording reception section and a recording processing section allowing the user to record content using a timer, the content timer-recorded in the timer recording reception section may be designated as the content which will be overwritten. In other words, the timer-recorded content is stored in the content storage 51 for later viewing. Therefore, it becomes possible to produce a convenient reproduction schedule to the user according to which the user can efficiently view more content by placing other content which is broadcast or delivered in real time, rather than the timer-recorded content, in the time slot in which the timer-recorded content is broadcast.

According to the method, it is possible to place, in temporal proximity of a piece of reference content, additional content related to the reference content and managed by the content storage 51 so that the additional content overwrites content included in an obtained EPG. By using a reproduction schedule produced in this manner, the user can continue to view related content. The user can therefore enjoy advantages over cases where the user view two pieces of content at different times: for example, the user can view the two pieces of content without a break. In other words, it becomes possible to produce an optimal reproduction schedule to the user. In addition, since the content provider can present related content to the user continuously, the provider can enjoy better advertisement effect and other advantages. In addition, since related content is placed in temporal proximity, the user does not need to search the huge amount of content in the content storage 51 for related content for viewing.

In S311 or S312, either one of preference or relevance is used to determine a placement position. This is by no means limiting. The content to be overwritten (in other words, a placement position) may be determined from content which has relevance is more than or equal to a certain threshold value and which also has preference less than or equal to a certain threshold value. If there exist multiple pieces of such content, the relevance or preference may be subjected to a conversion formula to identify a single piece of content to be overwritten. The conversion formula is not limited.

In the present embodiment, in the placement position information, there is a one-to-one correspondence between reference content and location determining procedure information. This is by no means limiting. For example, a set of location determining procedure information may be identified for each combination of reference content and additional content. An association table (content-procedure association table 142*a*) for the reference content and the location determining procedure information in a case like this is shown in FIG. 12.

For example, if the reference content is "content C-1" of "ID005," it is not necessarily preferable to place all additional content immediately before "content C-1." Accordingly, the location determining procedure information is so associated before storage that "content C-12" is placed immediately before "content C-1" if the additional content is "content C-12" of "ID007" and "content C-14" is placed immediately after "content C-1" if the additional content is "content C-14" of "ID009."

Accordingly, it is possible to set up a placement position for each piece of additional content the user wants to include in a schedule concerning a piece of reference content. It therefore becomes possible to maintain the reproduction schedule in an optimal state to the user in accordance with situation.

As described in the foregoing, the digital television 100 in accordance with the present embodiment, upon producing a reproduction schedule, prepares a local channel for stored content in addition to channels for content managed by an EPG and places broadcast content (delivered content, stored content) related to reference content in temporal proximity of the reference content. As a result, the user can continue to view related content. The user can enjoy advantages over cases where the user view the two pieces of content at different times: for example, the user can view the two pieces of content without a break.

As a result, it becomes possible produce an optimal reproduction schedule to the user.

In addition, since the content provider can present related content to the user continuously, the provider can enjoy better advertisement effect and other advantages. In addition, since related content is placed in temporal proximity, the user does not need to search the content storage 51 for related content for viewing. In addition, since a local channel is prepared, the user can view the content stored in the content storage 51 by simply switching to the local channel. Therefore, the user's labor to search for content before viewing is eliminated.

Embodiment 2

The preceding embodiment has described the digital television 100 which identifies additional content and determine its placement position on the basis of the sensed reference content so as to produce an optimal reproduction schedule to the user. The present embodiment will describe a digital television 200 which first senses additional content which the user wants to add and place the additional content at a placement position determined based on reference content to produce a reproduction schedule.

(Configuration of Digital Television 200)

Figure 13:
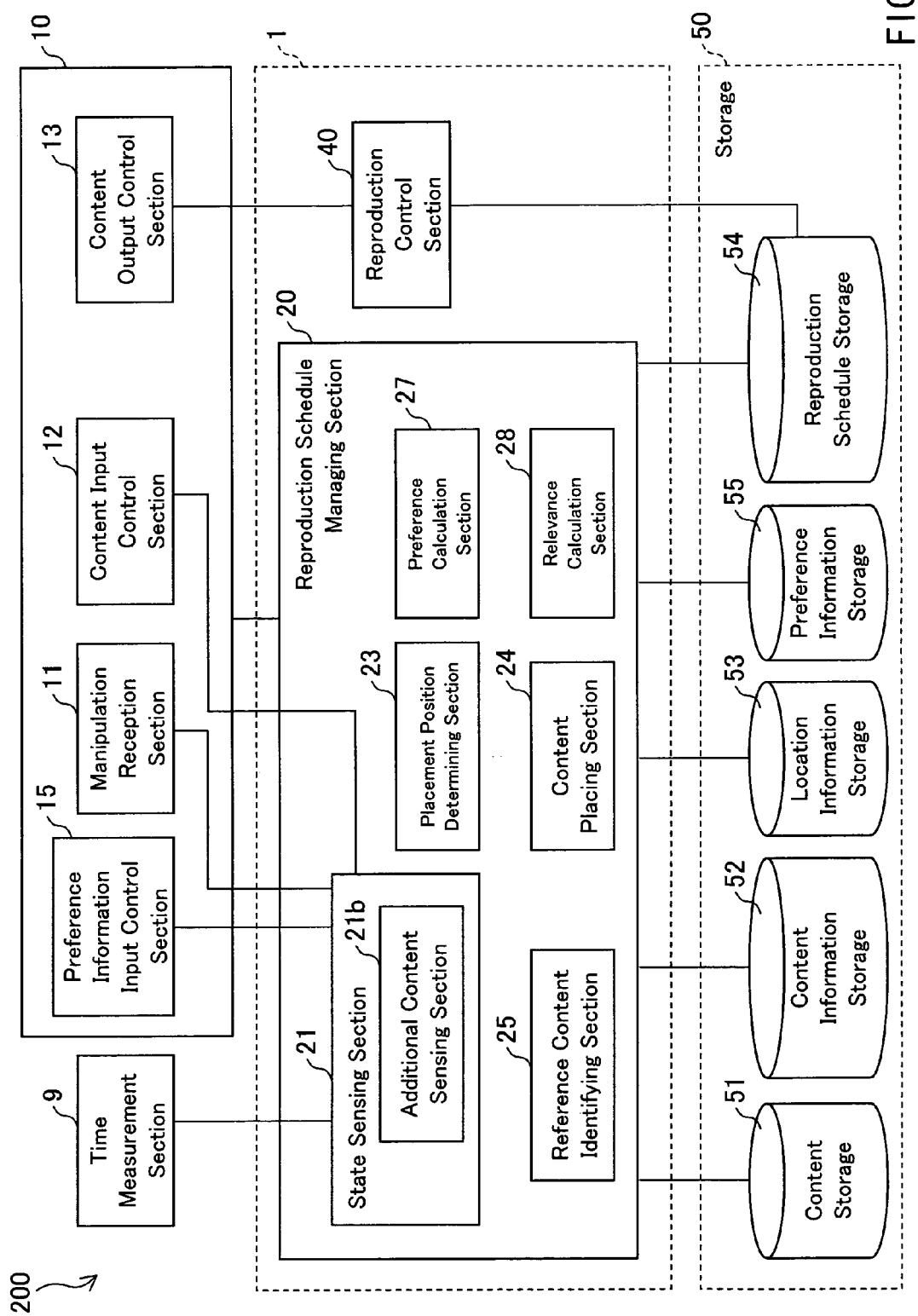
FIG. 13 is a block diagram illustrating the configuration of a major part of a digital television in accordance with another embodiment of the present invention.

FIG. 13 is a block diagram illustrating the configuration of a major part of a reproduction schedule managing section 20 in the digital television 200 in accordance with the present embodiment. As shown in FIG. 13, the reproduction schedule managing section 20 includes inside thereof a state sensing section 21, a reference content identifying section 25, a placement position determining section 23, and a content placing section 24. A storage 50 includes a content storage 51, a content information storage 52, a location information storage 53, a reproduction schedule storage 54, and a preference information storage 55. The reproduction schedule managing section 20 may further include a preference calculation section 27 and/or a relevance calculation section 28.

The numerals given to elements in FIG. 13 correspond to those given to elements in FIG. 1. The same numerals indicate the same elements. Therefore, description of the elements already described in embodiment 1 is not repeated.

The digital television 200 shown in FIG. 13 differs from the digital television 100 shown in FIG. 1 in that the reproduction schedule managing section 20 includes a reference content identifying section 25 in place of the additional content extracting section 22 and also that the state sensing section 21 includes inside thereof an additional content sensing section 21*b*.

The additional content sensing section 21*b*, when the state sensing section 21 determines to execute a reproduction schedule production process, senses which content to add (in other words, additional content). The additional content sensing method by the additional content sensing section 21*b* is by no means limited. For example, if the EPG obtained anew or a group of stored content stored anew on the basis of the content information (categories, etc.) of the additional content set up in advance in the storage 50 contains content belonging to a specified category, it may be determined as the additional content. Alternatively, the additional content may be randomly selected from the content managed by the content storage 51. In addition, if there is content yet to be included in the reproduction schedule, but which has higher preference than the content already included in the reproduction schedule, the content may be sensed as the additional content.

The reference content identifying section 25 identifies reference content related to the additional content on the basis of the content information of the additional content sensed by the additional content sensing section 21*b*. The content information of the identified reference content is needed for the placement position determining section 23 to identify a placement position for the additional content.

(Reproduction Schedule Production Process Flow 2)

Next, steps in a reproduction schedule production process executed by the reproduction schedule managing section 20 using various information on the storage 50 will be described.

Figure 14:
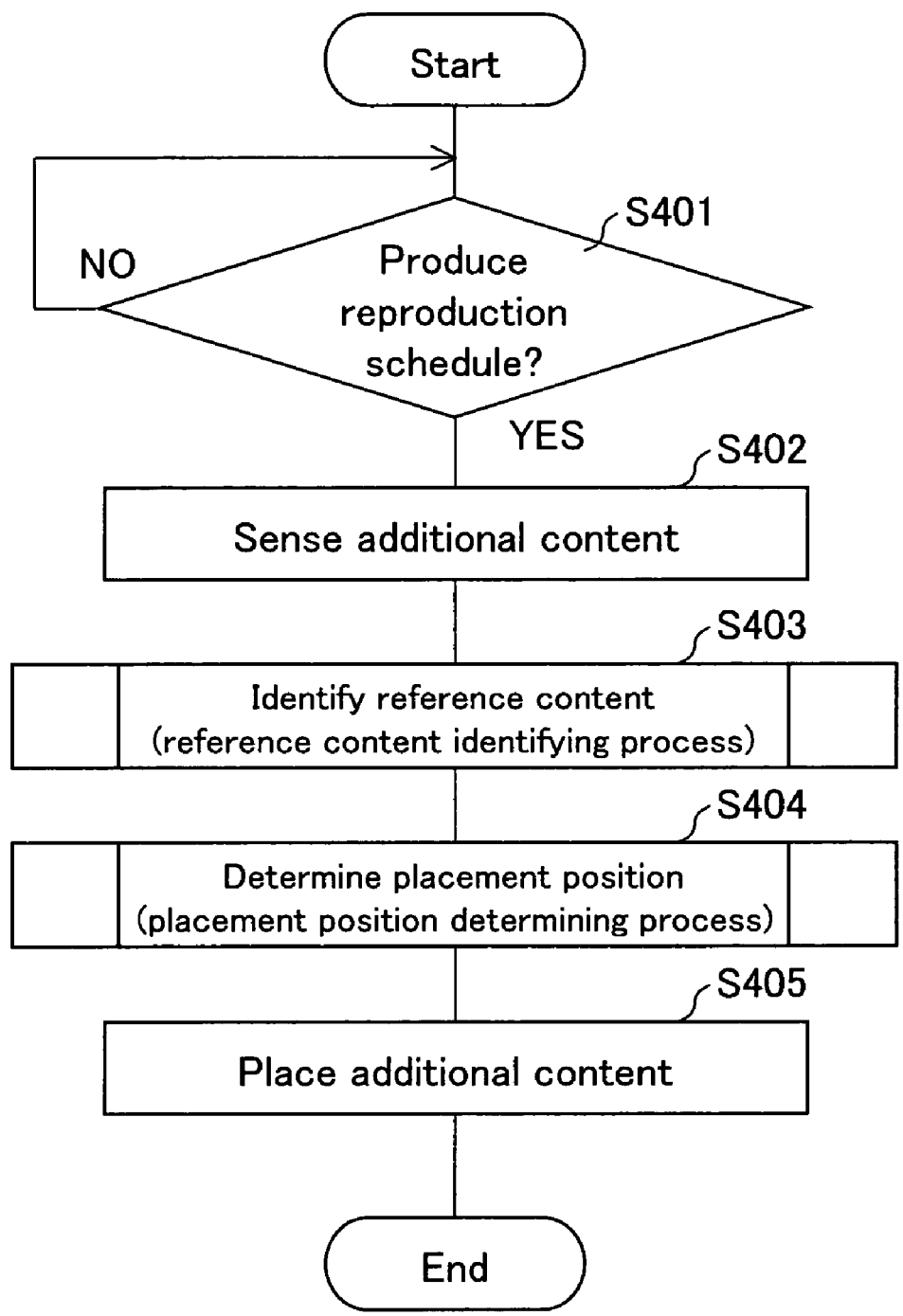
FIG. 14 is a flow chart illustrating the steps of a reproduction schedule production process in a digital television in accordance with another embodiment of the present invention.

FIG. 14 is a flow chart illustrating steps in a reproduction schedule production process in the reproduction schedule managing section 20 in accordance with the present embodiment.

First, the state sensing section 21 senses a predetermined state of the digital television 200 to determines to execute a reproduction schedule production process (S401). We assume here that the content storage 51 stores new content with high preference and that a state in which it is recognized that the content has higher preference than content placed in the reproduction schedule is sensed.

Next, the additional content sensing section 21*b* senses the content with higher preference than content placed in the reproduction schedule in the content group managed by the content storage 51 (S402). If there exist more than one piece of such content, the one with the highest preference may be selected.

Subsequently, the reference content identifying section 25 processes to identify reference content on the basis of the content information of the additional content sensed by the additional content sensing section 21*b* (S403). The reference content identifying process executed by the reference content identifying section 25 is a process of obtaining reference content from the content information of the additional content, opposite to the aforementioned additional content extraction process (the additional content is obtained from the content information of reference content). Apart from this point, the reference content identifying process executed by the reference content identifying section 25 is the same as the additional content extraction process (FIG. 7) in the additional content extracting section 22 in embodiment 1. Therefore, detailed description of the reference content identifying process is omitted.

Next, the placement position determining section 23 determines a placement position for the additional content in a reproduction schedule on the basis of the content information of the reference content identified in S403 (S404). The placement position determining process in S404 is the same as the placement position determining process in embodiment 1 shown in FIG. 8. Therefore, detailed describe of the placement position determining process in the present embodiment is omitted.

Finally, the content placing section 24 produces a reproduction schedule by placing the additional content sensed by the additional content sensing section 21b at the placement position determined in S404 (S405) for storage in the reproduction schedule storage 54.

According to the method, the higher the preference of the content managed by the content storage 51, the higher the priority given to the content in placing it as the additional content in the reproduction schedule. Further, the location where such additional content is placed is determined on the basis of the reference content related to the additional content. It therefore becomes possible to place the additional content at a suitable location with the relationship with the reference content being taken into consideration.

Hence, it becomes possible to produce and maintain an optimal reproduction schedule to the user.

Embodiment 3

Now, the following will describe a digital television 300 which produces a reproduction schedule with the placement position of content the user wants to add being determined first. In the present embodiment, the digital television 300 determines reference content from the placement position thereof, identifies additional content on the basis of the reference content, and places it at the placement position, to produce a reproduction schedule.

(Configuration of Digital Television 300)

Figure 15:
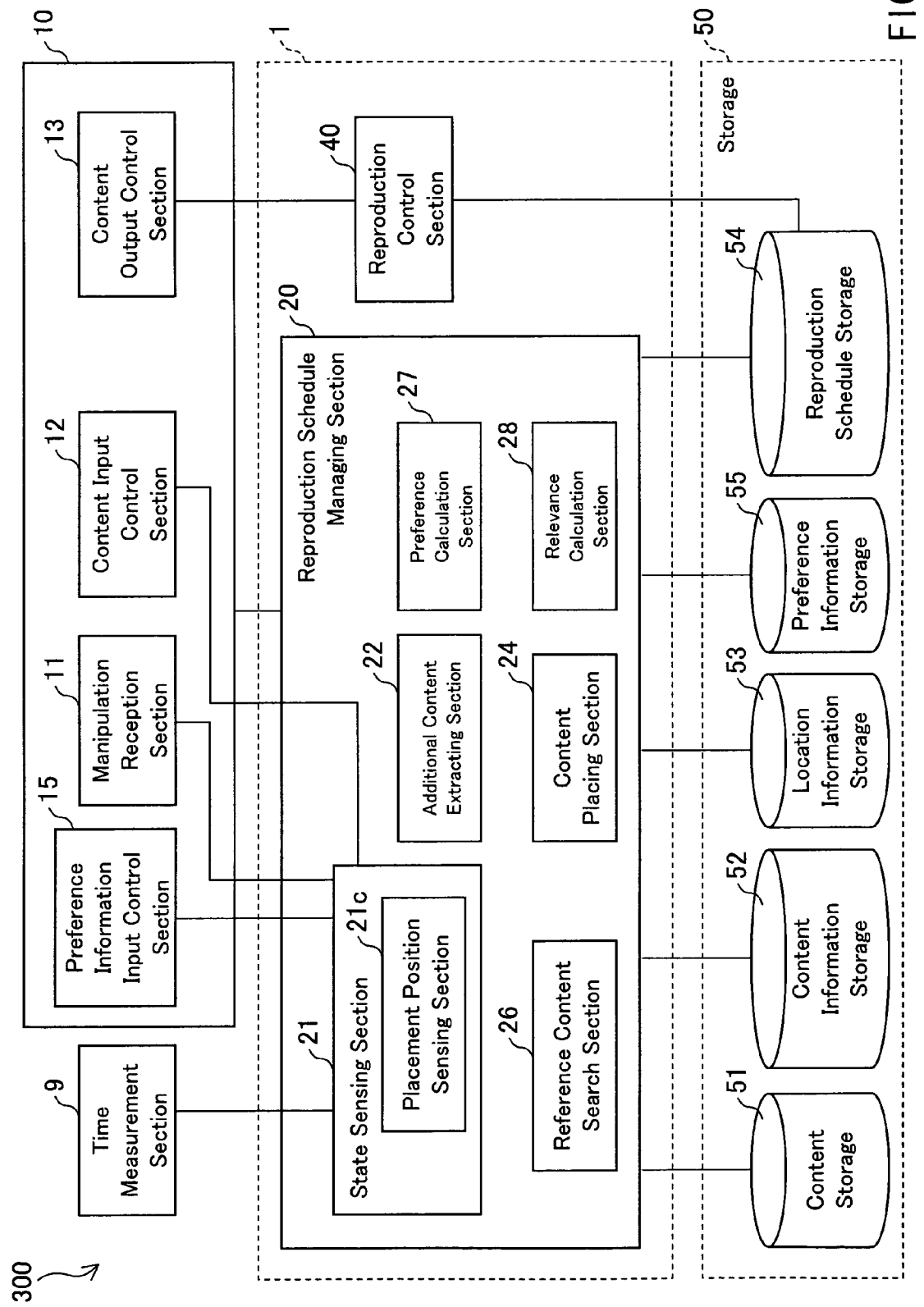
FIG. 15 a block diagram illustrating the configuration of a major part in a digital television in accordance with another embodiment of the present invention.

FIG. 15 is a block diagram illustrating the configuration of a major part of a reproduction schedule managing section 20 in the digital television 300 in accordance with the present embodiment. As shown in FIG. 15, the reproduction schedule managing section 20 includes inside thereof a state sensing section 21, a reference content search section 26, an additional content extracting section 22, and a content placing section 24. A storage 50 includes a content storage 51, a content information storage 52, a location information storage 53, a reproduction schedule storage 54, and a preference information storage 55. The reproduction schedule managing section 20 may further include a preference calculation section 27 and/or a relevance calculation section 28.

The numerals given to elements in FIG. 15 correspond to those given to elements in FIG. 1. The same numerals indicate the same elements. Therefore, description of the elements already described in embodiment 1 is not repeated.

The digital television 300 shown in FIG. 15 differs from the digital television 100 shown in FIG. 1 in that the reproduction schedule managing section 20 includes a reference content search section 26 in place of the placement position determining section 23 and also that the state sensing section 21 includes inside thereof a placement position sensing section 21c. The location information storage 53 contains inside thereof content search information to which the reference content search section 26 makes reference, which will be detailed later.

The placement position sensing section 21c, when the state sensing section 21 determines to execute a reproduction schedule production process, senses a placement position for additional content in a reproduction schedule. The placement position sensing method by the placement position sensing section 21c is by no means limited. For example, a placement position (or range) set up in advance in the storage 50 may be sensed as the placement position. Alternatively, a placement position may be selected randomly from given locations in the reproduction schedule. In addition, if a reproduction schedule already containing content is to be revised, preference may be calculated for each piece of content, and the placement position for the lowest preference content may be sensed as the placement position for the additional content.

In addition, when a command for a reproduction schedule production process is received from the user, a command signal may be received which specifies a placement position, and that may be recognized as the placement position.

Alternatively, a timer recording reception section may be monitored so that when a command for timer recording of broadcast (delivered) content in EPG is received, the location (time slot) where the broadcast (delivered) content is located may be recognized as the placement position. Timer-recorded content is stored in the content storage 51 for later viewing. Therefore, other content which is broadcast or delivered in real time, rather than the timer-recorded content, can be placed in the time slot in which the content is broadcast. Therefore, it becomes possible to obtain a reproduction schedule according to which the user can efficiently view more content.

The reference content search section 26 searches for the reference content on the basis of the placement position sensed by the placement position sensing section 21c. The reference content search section 26 searches for the reference content using the content search information contained in the location information storage 53.

Subsequently, the content search information contained in the location information storage 53 will be described.

The content search information is information indicating association between locations in a reproduction schedule (for example, placement positions A to N shown in FIG. 9) and reference content. In other words, the information is used to identify the reference content which acts as the reference in determining that the location in the reproduction schedule is the placement position for the additional content.

FIG. 16 is an illustration showing content search information contained in the location information storage 53. The content search information in accordance with the present embodiment includes a content-placement position association table 161 and a placement position-content association table 162. The content-placement position association table 161 contains a placement position for each piece of content. The placement position-content association table 162 is made using the content-placement position association table 161. Using the placement position-content association table 162, one can identify reference content from a placement position.

The content-placement position association table 161 shows, in terms of the information on the placement positions in the actual reproduction schedule shown in FIG. 9, which location will be determined as the placement position of the additional content on the basis of the content-procedure association table 142 shown in FIG. 4 when each piece of content becomes reference content. For example, a procedure code A03 is associated with the "content E-1" of ID004 from the content-procedure association table 142 in FIG. 4. A03 means from the location determining procedure list 141 location determining procedure information: "the placement position is immediately before the content." Therefore, if "content E-1" is reference content, it is understood from FIGS. 5 and 9 that it will be determined that the placement position of the additional content is the location B. The content-placement position association table 161 contains information on "location B" in association with the content ID, "ID004," of "content E-1."

The placement position-content association table 162 containing a corresponding piece of reference content for each placement position is produced utilizing the content-placement position association table 161 produced in this manner. For example, since the reference content for which the location B is determined as the placement position is "content B-5" of ID003' and "content E-1" of ID004 from the content-placement position association table 161, the content IDs, "ID003" and "ID004," are associated with and stored in "location B."

By referring to the content search information, the reference content search section 26 can search for reference content on the basis of the placement position sensed by the placement position sensing section 21c. Here, if multiple pieces of reference content are searched for, the reference content search section 26 may use the preference or relevance calculated respectively by the preference calculation section 27 and the relevance calculation section 28 to identify one piece of reference content. The identified reference content (or its content ID) is used for the additional content extracting section 22 to perform a process to extract additional content.

According to the configuration, when the reproduction schedule includes content with low user preference or content which the user does not want to view, the additional content that should overwrite the location where such content is located is automatically identified and placed there. Therefore, it becomes possible to maintain an optimal reproduction schedule to the user.

(Reproduction Schedule Production Process Flow 3)

Next, steps in reproduction schedule production process executed by the reproduction schedule managing section 20 using various information on the storage 50 will be described.

Figure 17:
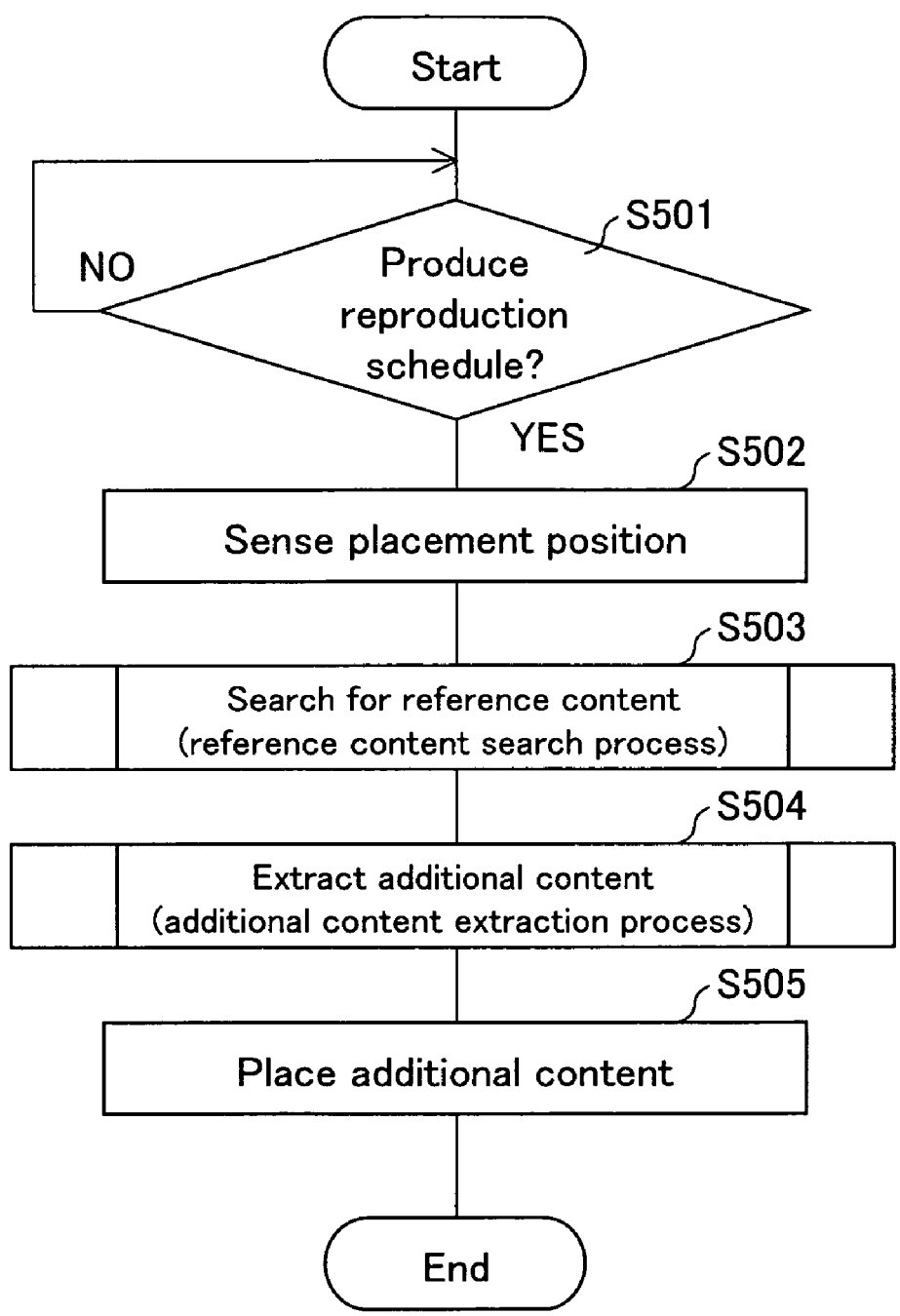
FIG. 17 is a flow chart illustrating the steps of a reproduction schedule production process in a digital television in accordance with another embodiment of the present invention.

FIG. 17 is a flow chart illustrating steps in a reproduction schedule production process in the reproduction schedule managing section 20 in accordance with the present embodiment.

First, the state sensing section 21 senses a predetermined state of the digital television 300 to determine to execute a reproduction schedule production process (S501). We assume here that the preference information contained in the preference information storage 55 is updated and that a state in which the reproduction schedule includes content with lower preference than a predetermined threshold value is sensed. The content with the lowest preference is the content that least matches user preferences and can be regarded as least likely to be viewed by the user. Therefore, according to the method, it becomes possible to place content more useful to the user by overwriting the content with the lowest preference so that a reproduction schedule which better matches user preferences is presented. In addition, the content provider can enjoy better advertisement effect and other advantages by offering content which the user will likely to view, rather than content which the user is unlikely to view.

Next, the placement position sensing section 21c refers to the reproduction schedule to search for content with the lowest user preference and senses the location where the content is placed as the placement position (S502). We assume here that the content with the lowest preference is "content F-1" and that the location F (FIG. 5) of "content F-1" in the reproduction schedule shown in FIG. 10 is sensed as the placement position.

Next, the reference content search section 26 executes a reference content search process to search for the reference content for which the location F is determined as the placement position of the additional content (S503). The reference content search process will be detailed later. We assume here that "content B-5" has been searched for as the reference content.

Subsequently, the additional content extracting section 22 extracts suitable additional content on the basis of the content information of the reference content, "content B-5," identified by the reference content search section 26 (S504). The additional content extraction process in the additional content extracting section 22 is the same as the process described in embodiment 1. No description is repeated here.

Finally, the content placing section 24 places the additional content extracted by the additional content extracting section 22 at the placement position sensed in S502 to produce a reproduction schedule (S505) for storage in the reproduction schedule storage 54.

(Reference Content Search Process)

Figure 18:
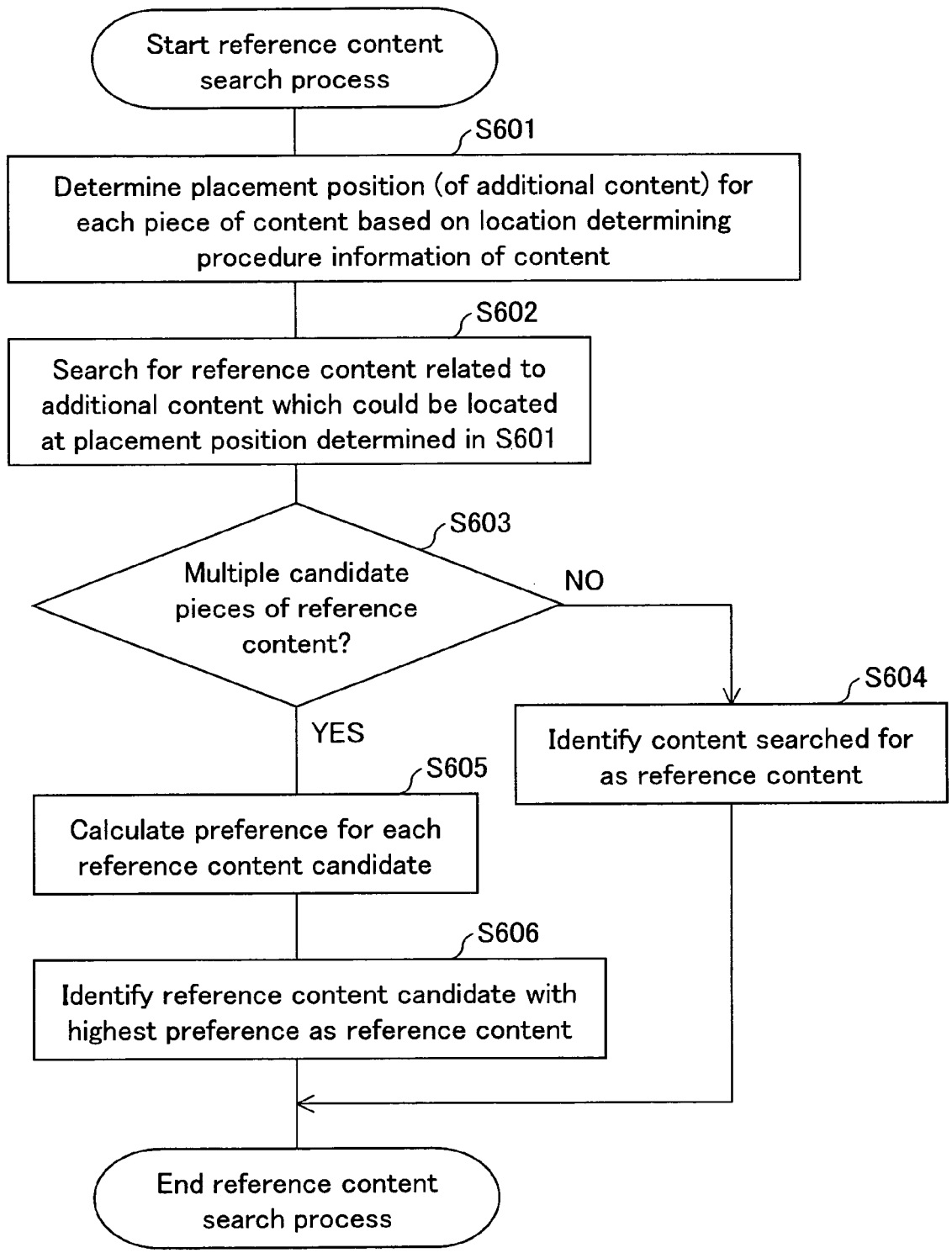
FIG. 18 is a flow chart illustrating the steps of a reference content search process in a reference content search section in a digital television of the present invention.

Subsequently, the reference content search process in S503 (FIG. 17) will be described in more detail. FIG. 18 is a flow chart illustrating steps in the reference content search process in the reference content search section 26.

Here, as an example, we assume that the placement position sensing section 21c senses the location F (FIG. 5) as the placement position in S502.

The reference content search section 26 determines a placement position for additional content for each piece of content managed by the content storage 51 on the basis of the location determining procedure information of each piece of content of placement position information contained in the location information storage 53 (S601). The placement position does not need to be determined every time as above; instead, an association table indicating content and placement positions (content-placement position association table 161) may be produced in advance for storage in the location information storage 53. The placement position-content association table 162 may be produced in advance on the basis of the content-placement position association table 161 for storage.

Subsequently, content for which the location sensed by the placement position sensing section 21c (here, location F) is determined as the placement position for the additional content is searched for (S602). We assume here that a reference is made to the placement position-content association table 162 and that the reference content, "content B-5" (with a content ID, "ID003"), is searched for based on location F.

Here, if one piece of content is searched for in S602 (NO in S603), the single piece of content searched for is identified as the reference content (S604), thereby ending the reference content search process.

In contrast, if multiple candidate pieces of reference content are searched for (YES in S603), to identify one piece of reference content, the preference calculation section 27 calculates preference for each reference content candidate which was searched for (S605). Subsequently, the reference content search section 26 identifies the reference content candidate with the highest preference as the reference content (S606). The content with the highest preference is the content that best matches user preferences and can be regarded as most likely to be viewed by the user. Therefore, it becomes possible to place content related to the content as the additional content, overwriting the original content. Therefore, it becomes possible to produce a preferred reproduction schedule to the user. In addition, the content provider can enjoy better advertisement effect and other advantages by offering content which the user will likely to view, rather than content which the user is unlikely to view.

The information of the reference content identified in S604 or S606 is supplied to the additional content extracting section 22 for use in executing the additional content extraction process.

According to the method, the content which will be overwritten is first determined from the content included in the reproduction schedule which will unlikely to be viewed, and the reference content is identified on the basis of the placement position of the content which will be overwritten. As the reference content is identified, the related additional content is extracted. The additional content is placed at the placement position of the content which will be overwritten.

From the above descriptions, the content which is unlikely to be viewed is removed from the reproduction schedule. Instead, additional content which is preferably placed at that location is placed. Therefore, it becomes possible to maintain an optimal reproduction schedule to the user.

[Variation 1: Additional Content Display Method]

Each of the aforementioned embodiments has described the additional content added upon producing a reproduction schedule being displayed on a local channel other than the EPG channels and on an EPG channel by overwriting the content determined unnecessary. However, the additional content placement method is not limited to these examples. The following will describe an additional content display method (proximity display) whereby the existence of additional content is displayed in proximity of the placement position of reference content in association with the placement position so that the user can recognize the display.

In this variation, the content output control section 13 shown in FIG. 1 which outputs a reproduction schedule further includes a reproduction schedule display control section 13a which controls how the reproduction schedule is displayed.

As it is determined in the reproduction schedule managing section 20 of the digital television 100 (200, 300) which piece of additional content is to be placed at which location, the reproduction schedule display control section 13a controls so that the additional content is displayed near the placement position of the reference content which serves as the reference for the additional content so that the user can recognize the display.

More specifically, for example, an icon, graphics, symbol, letter, or other marking indicating the additional content is added to the reference content and displayed. Alternatively, the content title of the additional content may be displayed near the reference content, or the reference content may be displayed in a different color to indicate the existence of the additional content. In other words, any method may be used so long as that method can convey to the user the existence of the additional content related to the reference content: for example, when the reference content in the reproduction schedule is manipulated and selected through the manipulation device 3, the user may be notified of the existence of the additional content by sound.

FIG. 19 is an illustration showing an example of the display of a reproduction schedule when the additional content is displayed near the reference content. We assume here that the reference content is "content G-2" and that the additional content is "content G-1."

In the example shown in FIG. 19, an icon 191 is displayed near the reference content, "content G-2," so that the user can recognize the additional content, "content G-1." Here, the title of the additional content, "content G-1," is also shown in a balloon 192. The display format for additional content is not limited to this example. The display format to notify of the existence of additional content is not limited to an icon, a balloon, etc.: text information may be used, or the reference content, "content G-2," may be displayed in a different color. Further, the existence of additional content may be notified of by outputting audio information.

Accordingly, the user can know that there is viewable content related to "content G-2" and that the content is "content G-1."

As a result, related pieces of content are displayed close to each other in the reproduction schedule. The user is freed from the troublesome operation to search the content storage 51 for related content.

[Variation 2: Reproduction Sequence Placement Method]

If there is a sequence in which reference content and additional content are to be reproduced, the placement position determining section 23 may determine the placement position of the additional content using series information assigned to each piece of content (see item 134a in FIG. 3; "series information") so that each piece of content is placed in a suitable sequence.

For example, when the reference content, "content G-2," is the second episode of drama content, and the additional content, "content G-1," is digest content of the first episode of the drama content, it is preferable if "content G-1" is placed before "content G-2" in terms of time.

For the placement position determining section 23 to recognize that, series information is contained in item 134a in FIG. 3. In the example shown in FIG. 3, the series information contains a group identifier 135 and a series number 136. The group identifier 135 is used to identify a series of content groups. In addition, the series number 136 consists of digits indicating how many pieces of content are included in the content group to which the content belongs and digits indicating the sequential position of the content in the group.

For example, the series information, "C01-3/4," of the content ID, "ID008," shown in FIG. 3 indicates that: "The content of the content title "content C-13" is the third content in the content group C01 consisting of four pieces of content."

Accordingly, the placement position determining section 23 refers to the "series information" contained in item 134a in FIG. 3 and recognizes that content must be placed so that "content G-1" is followed by "content G-2." The placement position determining section 23 determines a placement position for the additional content, "content G-1," before the time slot containing "content G-2." If there are multiple placement position candidates in a range before "content G-2," similarly to the aforementioned embodiments, one placement position may be determined by preference, relevance, etc.

Accordingly, targets for which preference, relevance, etc. are calculated are narrowed down to efficiently determining locations, and the content group with a predetermined fixed reproduction sequence can be placed sequentially in the reproduction schedule in a suitable manner.

As a result, it becomes possible produce an optimal reproduction schedule to the user.

(Computer System Configuration to Realize Content Processing Device)

Figure 20:
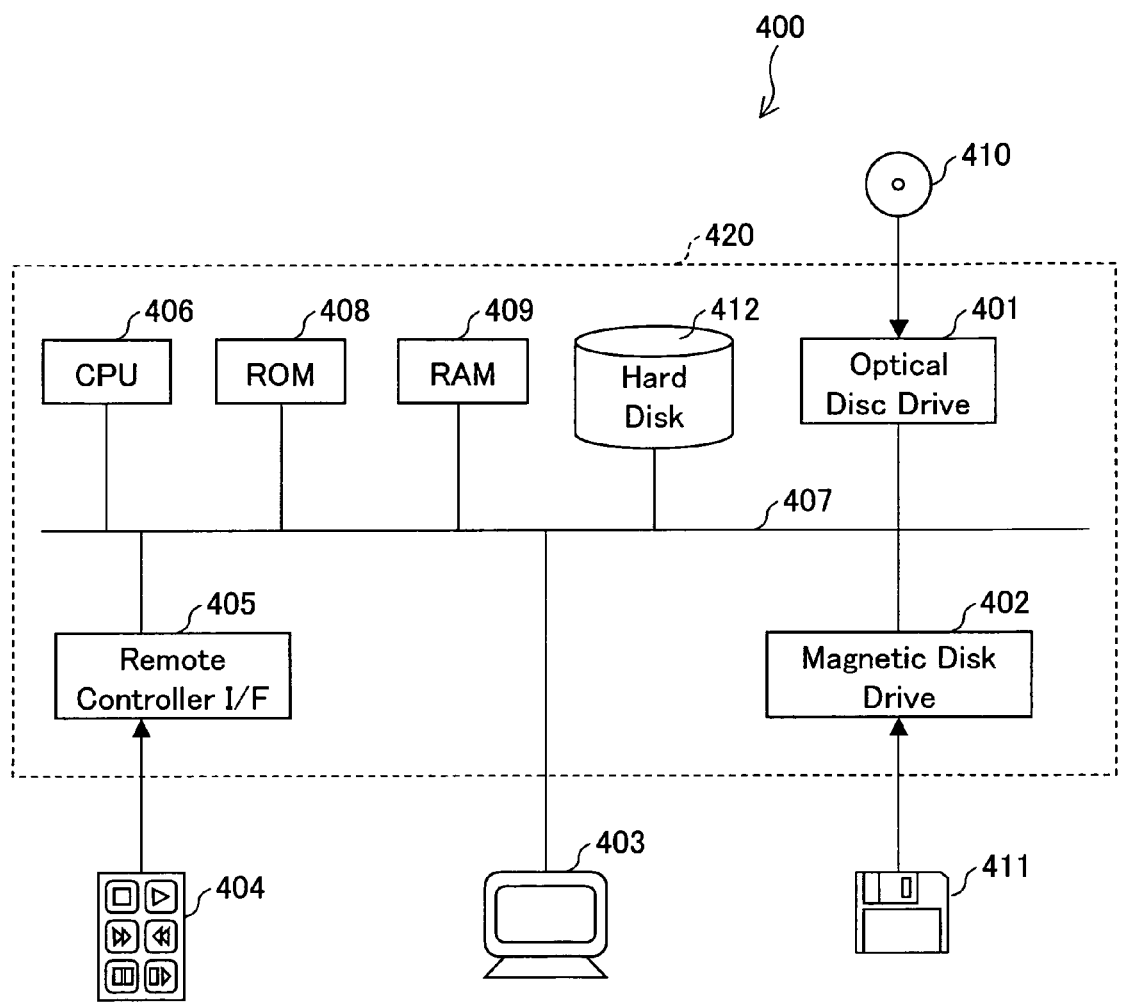
FIG. 20 a block diagram schematically illustrating the configuration of a computer system realizing a digital television of the present invention.

A content processing device (digital television 100 (200, 300)) in accordance with the present invention is realized essentially by computer hardware, computer programs executed by the computer hardware, and data contained in the computer hardware. FIG. 20 illustrates the internal configuration of such a computer system 400.

Referring to FIG. 20, the computer system 400 includes a computer 420, a monitor 403, and a remote controller 404. The computer 420 includes an optical disc drive 401 and a magnetic disk drive 402.

The computer 420 includes, in addition to the optical disc drive 401 and the magnetic disk drive 402, a remote controller interface (I/F) 405, a CPU (central processing unit/control section 2) 406, a bus 407, a read-only memory (ROM) 408, and a random access memory (RAM) 409. The remote controller interface (I/F) 405 receives signals from the remote controller 404. The bus 407 connects the remote controller interface 405, the CPU 406, the optical disc drive 401, and the magnetic disk drive 402. The read-only memory (ROM) 408 is connected to the bus 407 and contains boot and other programs. The random access memory (RAM) 409 is also connected to the bus 407 and contains program instructions, system programs, work data, etc.

Although not shown, the computer 420 may further include a network adapter board providing connection to a local area network (LAN).

Both the content data and the computer programs which realize the functions of the content processing device on the computer system 400 are contained on an optical disc 410 or magnetic disk 411 inserted in the optical disc drive 401 or magnetic disk drive 402 and transferred to a hard disk 412. Alternatively, the content and computer programs may be transmitted to the computer 420 over a network (not shown) for storage in the hard disk 412. The programs are loaded into the random access memory 409 upon execution. The programs may be loaded directly into the random access memory 409 from the optical disc 410, from the magnetic disk 411, or over a network.

The programs include a plurality of instructions realizing the functions of the content processing device in accordance with the present invention on the computer 420. Some of the basic functions needed to realize these functions are provided by an operating system (OS) or third party programs running on the computer 420 or as a module which includes various toolkits installed on the computer 420. Therefore, the programs do not necessarily include all functions needed to realize the functions of the content processing device in accordance with the present invention. The programs need to include only those instructions which execute the control of the content processing device by recalling suitable functions or "tool" in such a controlled manner that desired results are achieved. The operation of the computer system 400 is well known and not explained here.

The storage medium containing the content data and the computer programs realizing the functions of the content processing device is by no means limited to the optical disc 410 which may be a CD-ROM (compact disc read-only memory), MO (magneto-optical disc), MD (MiniDisc), or DVD (digital versatile disc) or the magnetic disk 411 which may be a FD (flexible disk) or hard disk. Examples of such a storage medium include tapes, such as magnetic tapes and cassette tapes; card storage media, such as IC (integrated circuit) cards and optical cards; and semiconductor memories, such as mask ROMs, EPROMs (erasable programmable ROMs), EEPROMs (electrically erasable programmable ROMs), and flash ROMs. Nevertheless, the computer system 400 needs to have a readout device for retrieval from these storage media.

(Configuration of Content Processing System)

Further, the aforementioned embodiments described the content processing device in accordance with the present invention as the digital television 100 (200, 300) including the reproduction schedule managing section 20 for producing a reproduction schedule and the reproduction control section 40 for reproducing content in accordance with the reproduction schedule produced by the reproduction schedule managing section 20. The content processing device in accordance with the present invention is however by no means limited to this configuration.

For example, the reproduction schedule managing section 20 and the reproduction control section 40 may be provided in separate devices. Specifically, there may be provided a reproduction schedule produce device (not shown) which contains the reproduction schedule managing section 20 and a content reproduction device (not shown) which contains the reproduction control section 40. By connecting the devices over a network so that they can communicate with each other, a content processing system (not shown) can be constructed which essentially produces the same effects as the content processing device (digital television 100 (200, 300)) in accordance with the present invention.

The reproduction control section 40, which reproduces content based on the reproduction schedule produced by the reproduction schedule produce device, will be described.

The reproduction control section 40 in the content reproduction device performs a content reproduction process on the basis of the reproduction schedule produced by the reproduction schedule produce device. For example, if the schedule says that content A managed by the content storage 51 is to be reproduced from 19:00 to 19:30, the reproduction control section 40, at 19:00 which is the reproduction starting time, extracts content A stored in the content storage 51 (if content A is stored content) and performs a reproduction process. Here, if content A is broadcast content, the section 40 selects the broadcast station which broadcasts content A to receive content A. If content A is delivered content, content A is obtained via the communications device 7 (FIG. 1) in the content reproduction device for reproduction.

Here, content A subjected to a reproduction process is output to the display 5, the audio output device 6, etc. Accordingly, the user can view content A.

In addition, the digital television 100 (200, 300) described in the embodiments is a mere example and by no means limiting the content processing device in accordance with the present invention. For example, the content processing device in accordance with the present invention is applicable to any kind of information processing devices including personal computers, mobile phones, PDAs (personal digital assistances), and radios.

The present invention is not limited to the description of the embodiments above, but may be altered by a skilled person within the scope of the claims. An embodiment based on a proper combination of technical means disclosed in different embodiments is encompassed in the technical scope of the present invention.

Finally, the blocks in the digital television 100 (200, 300) blocks, especially, the state sensing section 21, the additional content extracting section 22, the placement position determining section 23, the reference content identifying section 25, and the reference content search section 26, may be implemented by hardware logic or software executed by a CPU as below:

The digital television 100 includes a CPU (central processing unit) and memory devices (memory media). The CPU (central processing unit) executes instructions in control programs realizing the functions. The memory devices include a ROM (read only memory) which contains the programs, a RAM (random access memory) to which the programs are loaded, and a memory containing the programs and various data. The objective of the present invention can also be achieved by mounting to the digital television 100 a computer-readable storage medium containing control program code (execute program, intermediate code program, or source program) for the digital television 100 which is software realizing the aforementioned functions, in order for the computer (or CPU, MPU) to retrieve and execute the program code contained in the storage medium.

The storage medium may be, for example, a tape, such as a magnetic tape and a cassette tape; a magnetic disk, such as a floppy (registered trademark) disk or a hard disk, or an optical disc, such as a CD-ROM/MO/MD/DVD/CD-R; a card, such as an IC card (memory card) or an optical card; or a semiconductor memory. such as a mask ROM/EPROM/EEPROM/flash ROM.

The digital television 1 may be arranged to be connectable to a communications network so that the program code may be delivered over the communications network. The communications network is not limited in any particular manner, and may be, for example, the Internet, an intranet, extranet, LAN, ISDN, VAN, CATV communications network, virtual dedicated network (virtual private network), telephone line network, mobile communications network, or satellite communications network. The transfer medium which makes up the communications network is not limited in any particular manner, and may be, for example, wired lines, such as IEEE 1394, USB, electric power line, cable TV line, telephone line, or ADSL line; or wireless, such as infrared radiation (IrDA, remote control), Bluetooth (registered trademark), 802.11 wireless, HDR, mobile telephone network, satellite line, or terrestrial digital network. The present invention encompasses a carrier wave or a data signal transmission in which the program code is embedded electronically.

(Supplement)

The content processing device (digital television 100 (200, 300)) in accordance with the present invention is characterized in that it includes: content information extracting means (reference content sensing section 21*a*) for extracting content information on content; related content extracting means (additional content extracting section 22) for extracting second content (additional content) related to first content based on first content information on the first content (reference content) extracted by the content information extracting means; and reproduction schedule producing means (content placing section 24) for producing a content reproduction schedule by placing the second content extracted by the related content extracting means at a position in accordance with the first content.

The schedule producing method in accordance with the present invention is characterized in that it includes the steps of: content information extracting step of extracting content information on content; related content extracting step of extracting second content related to first content based on first content information on the first content extracted in the content information extracting step; and reproduction schedule producing step of producing a content reproduction schedule by placing the second content extracted in the related content extracting step at a position in accordance with the first content.

Accordingly, the reproduction schedule producing means (reproduction schedule producing step) produces a reproduction schedule by placing the second content related to the first content at a position in accordance with the first content.

If, for example, there is a reproduction schedule (electronic program table for broadcast content, delivery plan table, etc.) showing a delivery plan of broadcast content transmitted on broadcast waves and delivered content delivered over a communications network, the content processing device in accordance with the present invention may prepare, separately from that reproduction schedule, a channel dedicated to the reproduction of related pieces of content which are edited independently by content processing device and placed closely (hereinafter, "related content channel") and place the second content in the related content channel at the positions preceding/following the time period where the first content is located, so as to produce the reproduction schedule.

As a result, the user can view related content without a long temporal interval. When compared viewing at different times, the user can view it without a break and enjoy other advantages too. In addition, the content provider can enjoy better advertisement effect and other advantages by offering related content continuously.

For example, if digest content of a preceding episode of drama content is stored in the content storage 51, the digest content of the preceding episode is placed at a position immediately before the drama content of the succeeding episode is broadcast. As a result, immediately after viewing the digest content of the preceding episode, the user can view a sequence without a break.

In addition, for example, when the content storage 51 contains advertisement content promoting the title track of certain drama content, the advertisement content for the title track is placed at a position immediately after the drama content is broadcast. As a result, the advertisement for the title track which the user heard while viewing the drama is reproduced continuously after viewing the drama, thereby encouraging the user to purchase the music.

Further, since related pieces of content are placed in temporal proximity, the user does not need to search the content storage 51 for related content for viewing. In addition, if a separate related content channel is prepared to accommodate the second content, the user can view the content store in the content storage 51 by only switching to the related content channel. Therefore, the user's labor to search for content before viewing is eliminated.

The content processing device in accordance with the present invention preferably include preference calculating means for calculating user preference for content, wherein: the preference calculating means calculates user preference for one or more pieces of content placed in temporal proximity of the position where the first content is located; and the reproduction schedule producing means produces a reproduction schedule by placing the second content so that the second content overwrites the content with preference less than or equal to a threshold value.

According to the arrangement, the preference calculating means calculates user preference for content placed in temporal proximity of the position where the first content is located. The reproduction schedule producing means produces a reproduction schedule by placing the second content so that the second content overwrites the content with preference less than or equal to a threshold value.

The content processing device preferably includes: a content storage 51 storing input content; and relevance calculating means for calculating relevance between the first content and the second content from the first content information on the first content and the second content information on the second content. The related content extracting means extracts the second content from the content contained in the content storage 51 on the basis of the relevance calculating means.

According to the arrangement, the content storage 51 stores input content. The relevance calculating means calculates relevance between the first content and the second content from the first content information on the first content and the second content information on the second content. The related content extracting means extracts the second content from the content contained in the content storage 51 on the basis of the relevance.

The content processing device preferably includes preference calculating means for calculating user preference for content, wherein: the preference calculating means calculates user preference for the content in an electronic program table or in a delivery plan table; and the reproduction schedule producing means designates the content with the highest preference in the content as the first content.

According to the configuration, the preference calculating means calculates user preference for content, and the reproduction schedule producing means designates the content with the highest preference as the first content.

The content processing device in accordance with the present invention is capable of producing a reproduction schedule by placing each piece of stored content and/or broadcast (delivered) content considering substance and relationship on the basis of the content information of each piece of content. Therefore, the device is preferably applicable to reproduction schedule produce devices which manage content and produce a reproduction schedule and content reproduction devices which reproduce content in accordance with the produced reproduction schedule.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

A content processing device in accordance with the present invention, to solve the problems, is characterized in that it is a content processing device for managing a reproduction schedule specifying time slots in which content is reproduced, each piece of content being associated with content information indicating an attribute of the piece of content, to add new additional content to the reproduction schedule on the basis of reference content scheduled in a time slot in the reproduction schedule, the device including: additional content identifying means for identifying, as the additional content, content associated with content information which meets conditions determined on the basis of content information of the reference content; and time slot determining means for determining, based on time slot determining procedure information based on which a time slot is determined for the additional content related to the reference content, a time slot for the additional content identified by the additional content identifying means.

According to the configuration, the additional content identifying means identifies, as the additional content, content having content information which meets conditions determined on the basis of content information of content which is/will be scheduled in a reproduction schedule to serve as a reference (reference content). Additional content is content the user wants to add to the reproduction schedule apart from the reference content.

Content information is information which indicates an attribute of content and is stored for each piece of content in association with that piece of content.

Next, the time slot determining means determines where (in which time slot) to schedule the additional content identified by the additional content identifying means in the reproduction schedule, based on time slot determining procedure information of the reference content.

Accordingly, it becomes possible to select the additional content having content information which meets the conditions on the basis of the content information of the reference content scheduled in the reproduction schedule and to schedule the selected additional content in the time slot determined on the basis of the time slot determining procedure information of the reference content.

Here, the content information refers to, for example, content meta-information of each piece of content or information described in an electronic program table. The content meta-information may be, for example, the title, personalities information, content substance, or a key word of the content, but by no means limited to these examples. The content meta-information refers to all information on the content.

More specifically, the content information of the reference content is, for example, the title of the reference content. Content which has the same title (at least partially) as the reference content can be identified as the additional content.

The time slot determining procedure information of the reference content is, for example, information which specifies a range from a reproduction starting time and ending time of the reference content. If such information is available, the time slot determining means can determine, as the time slot of the additional content, the time slot immediately before the reproduction starting time or immediately after the reproduction ending time of the reference content.

Accordingly, once the reference content is determined, content closely related to the reference content (in the aforementioned example, content of the same title) can be scheduled in a time slot near the reference content (in the aforementioned example, in a continuous time slot) in the reproduction schedule. Therefore, a reproduction schedule can be produced in which related pieces of content are scheduled together close to each other.

As a result, it becomes possible to produce an optimal, convenient reproduction schedule to the user according to which the user can collectively view related content.

Another content processing device in accordance with the present invention, to solve the problems, is characterized in that it is a content processing device for managing a reproduction schedule specifying time slots in which content is reproduced, each piece of content being associated with content information indicating an attribute of the piece of content, to determine, on the basis of reference content scheduled in a time slot in the reproduction schedule, a time slot for additional content newly added to the reproduction schedule, the device including: reference content identifying means for identifying, as the reference content, content associated with content information which meets conditions determined on the basis of content information of the additional content; and time slot determining means for determining a time slot for the additional content based on time slot determining procedure information based on which a time slot is determined for the additional content related to the reference content identified by the reference content identifying means.

According to the configuration, the reference content identifying means identifies, as the reference content, content having content information which meets conditions determined on the basis of the content information of the additional content determined in advance to be added to the reproduction schedule. The content information of the reference content is used to identify the additional content.

Subsequently, the time slot determining means determines a time slot for the additional content on the basis of the time slot determining procedure information of the reference content identified by the reference content identifying means.

Accordingly, it becomes possible to decide a time slot for the additional content on the basis of the time slot determining procedure information of the reference content related to the additional content the user wants to add to the reproduction schedule and to schedule the additional content in that time slot.

Thus, once the additional content the user wants to add is determined, similarly to the aforementioned example, the additional content can be scheduled in a time slot near the closely related reference content (in the aforementioned example, content of the same title) (in the aforementioned example, in a continuous time slot) in the reproduction schedule. Therefore, a reproduction schedule can be produced in which related pieces of content are scheduled together close to each other.

As a result, it becomes possible to produce an optimal, convenient reproduction schedule to the user according to which the user can collectively view related content.

Another content processing device in accordance with the present invention, to solve the problems, is characterized in that it is a content processing device for managing a reproduction schedule specifying time slots in which content is reproduced, each piece of content being associated with content information indicating an attribute of the piece of content, to determine, on the basis of reference content scheduled in a time slot in the reproduction schedule, additional content newly added to a predetermined time slot in the reproduction schedule, the device including: reference content identifying means for identifying reference content which corresponds to the predetermined time slot on the basis of content search information indicating association between a time slot in the reproduction schedule and content, associated with that time slot, which is scheduled in the reproduction schedule; and additional content identifying means for identifying, as the additional content, content associated with content information which meets conditions determined on the basis of content information of the reference content identified by the reference content identifying means.

According to the configuration, the reference content identifying means identifies, as the reference content, content associated with a predetermined time slot to which whatever additional content is to be added, on the basis of content search information recorded in advance indicating association between content and a time slot (for additional content). The content information of the identified reference content is used to identify the additional content.

Subsequently, the additional content identifying means identifies, as the additional content, content having content information which meets conditions determined on the basis of the content information of the identified reference content.

In other words, when whatever additional content is to be added to a predetermined time slot, to identify the additional content, first, reference content corresponding to the predetermined time slot is identified, and additional content related to the reference content is identified. Therefore, it becomes possible to schedule additional content related to the obtained reference content in the predetermined time slot.

Specifically, suppose, for example, that there is reference content A having time slot determining procedure information which instructs to determine a time slot immediately after reference content. If time slot B immediately after reference content A is the predetermined time slot, reference content A is determined on the basis of the content search information and predetermined time slot B.

Then, additional content B which meets conditions (for example, which has a key word which matches the key word of reference content A, "commercial goods A") is identified on the basis of the content information of reference content A. Identified additional content B is scheduled in the predetermined time slot, that is, in time slot B immediately after reference content A.

Thus, a reproduction schedule can be produced in which closely related pieces of content (those pieces of content which are related to the same key word, "commercial goods A") are scheduled close to each other (continuously from reference content A to additional content B or vice versa).

As a result, it becomes possible to produce an optimal, convenient reproduction schedule to the user according to which the user can collectively view related content.

In the content processing device, the time slot determining procedure information may be information instructing to determine, as the time slot of the additional content, a time slot immediately before and/or immediately after the reference content.

Alternatively, the time slot determining procedure information may be information instructing to determine, as the time slot of the additional content, a time slot in a period identified by (i) a reproduction starting time of the reference content and (ii) a point in time a predetermined time before the reproduction starting time and/or a period identified by (i) a reproduction ending time of the reference content and (ii) a point in time a predetermined time after the reproduction ending time.

In other words, the time slot determining procedure information is information instructing determine temporal proximity of the reference content scheduled in the reproduction schedule as a placement position of the additional content.

More specifically, the time slot of the additional content, instructed by the time slot determining procedure information may be, for example, the time slot immediately before and/or immediately after where the reference content is scheduled, or a time slot included in a few hours (or a few days) before and/or after the time slot where the reference content is scheduled. Alternatively, the time slot may be such a time slot that reproduction is started (ended) at a given point in time specified with the time slot of the reference content as the reference.

In other words, the time slot determining procedure information may be anything so long as it can be determined that at which location the placement position of the additional content in the reproduction schedule can be placed with the reference content as the reference.

"Immediately before and/or immediately after the reference content" refers to a time slot immediately before and/or immediately after the time slot of the reference content scheduled in the reproduction schedule: for example, the position immediately before the (planned) reproduction starting time of the reference content or immediately after the (planned) reproduction ending time of the reference content.

Accordingly, for example, by placing the additional content in temporal proximity of the reference content, the user can collectively view related pieces of content; therefore, no breaks occur during viewing. In addition, the additional content can be scheduled in the same time slot of the following day as the time slot where the reference content is scheduled. Accordingly, the user can view related pieces of content at the same time of the following day and develop habitual viewing.

The content information associated with the reference content may, if the content is an episode of a story-telling drama, include, for example, sequence information identifying the particular episode contained in that content in the sequence of all the episodes of the drama. Using the sequence information, it becomes possible to place the reference content and the additional content in accordance with the sequence.

In the content processing device, each piece of content may be associated with preference indicating a user preference for the content; and the time slot determining procedure information may be information instructing to determine, as the time slot of the additional content, a time slot of content, scheduled in the reproduction schedule, which is associated with preference less than or equal to a predetermined threshold value.

The preference represents quantitatively how well the content matches user preferences. Any method can be used to calculate the preference. The preference may be calculated with any existing method.

Here, the time slot of content for which the preference is less than or equal to a threshold value means a time slot in which is scheduled content that does not match user preferences.

That means that the time slot determining means determines, as a time slot to schedule the additional content, a time slot in which is scheduled content that does not match user preferences. Additional content is either predetermined to be added or identified on the basis of the reference content. Therefore, by overwriting the content which does not match user preferences, it is possible to schedule additional content which should be scheduled in a reproduction schedule so as to produce a reproduction schedule. Content which does not match user preference is unlikely to be viewed by the user. It would be preferable to the user to schedule related content in the time slot.

As a result, it becomes possible to make good use of the time slot where content which does not match user preferences is scheduled and to provide an optimal reproduction schedule to the user.

Further, the content processing device may include, in addition to the foregoing configuration, relevance calculating means for calculating a degree of relation between the reference content and each piece of content based on the content information of the reference content and the content information of each piece of content, wherein the additional content identifying means may identify, as the additional content, content with the highest degree of relation with the reference content calculated by the relevance calculating means.

The degree of relation is an indicator representing relationship between two pieces of content. The degree of relation is high for pieces of content which are closely related to each other and low for pieces of content which are remotely related to each other. For example, since, like in a drama program consisting of multiple episodes, both "Episode II" of "drama A" and "Episode III" of "drama A" are content related to the same "drama A," their degree of relation is high. Animation content and an advertisement for commercial goods involving a cartoon character of the animation content are content related to the same animation content; their degree of relation is high. Further, content in which the same person appears and content belonging to the same category also have a high degree of relation.

In other words, a degree of relation is calculated between the reference content and each piece of content stored in a content-storing storage to know how much they are related considering their substance.

Accordingly, the additional content identifying means can identify, as the additional content; content having the highest relationship with the reference content. It therefore becomes possible to add such additional content to the reproduction schedule.

As a result, it becomes possible to produce an optimal, convenient reproduction schedule to the user according to which the user can collectively view related content.

In the content processing device, each piece of content may be associated with preference indicating a user preference for the content; and the additional content identifying means may identify content with the highest preference as the additional content.

Accordingly, even if there are identified multiple additional pieces of content, the additional content identifying means can identify, as the additional content, the content which best matches user preferences. Therefore, the content which best matches the user preferences is added to the reproduction schedule. As a result, it becomes possible to produce a reproduction schedule which is optimal to the user and which includes match which matches the user preferences.

The content processing device may further include a communications device for obtaining over a communications network the additional content identified by the additional content identifying means.

For example, even if the storage of the device contains no additional content or even if the storage contains no content whose relevance calculated by the relevance calculating means exceeds a predetermined threshold value, the additional content identifying means controls the communications device so that the means can obtain the identified additional content over a network, thereby obtaining the additional content.

The communications device may obtain additional content on a network. Also, the communications device may inquire broadcast stations and content delivery stations whether or not they have content related to the reference content, so as to obtain, as the additional content, the content related to the reference content from the broadcast station or content delivery station. In a case like this, the broadcast station or content delivery station may of course charge for the service.

Accordingly, even if the storage contains no content related to the reference content, the communications device can extract content related to the reference content over a network.

Further, the content processing device may include, in addition to the foregoing configuration, relevance calculating means for calculating a degree of relation between the reference content and each piece of content based on the content information of the reference content and the content information of each piece of content, wherein the reference content identifying means may identify, as the reference content, content with the highest degree of relation with the additional content calculated by the relevance calculating means.

Accordingly, even if the reference content identifying means has identified multiple pieces of reference content, the means can identify, as the reference content, one of the pieces of reference content with the highest relationship with the additional content. Therefore, it becomes possible to determine a time slot for the additional content based on the reference content most related to the additional content. As a result, it becomes possible to produce an optimal, convenient reproduction schedule to the user according to which the user can collectively view related content.

In the content processing device, each piece of content may be associated with preference indicating a user preference for the content; and the reference content identifying means may identify content with the highest preference as the reference content.

Accordingly, even if the reference content identifying means has identified multiple pieces of reference content, the means can identify, as the reference content, one of the pieces of reference content which best matches the user preference. Therefore, the content which best matches the user preference serves as the reference in determining positions in the reproduction schedule. As a result, it becomes possible to produce an optimal reproduction schedule to the user in which are included content which matches the user preference.

In the content processing device, each piece of content may be associated with preference indicating a user preference for the content; and the device may further include reference content sensing means for sensing content with the highest preference as the reference content.

Accordingly, it is possible to identify additional content on the basis of the reference content which best matches the user preference and determine a time slot for the additional content. It therefore becomes possible to produce an optimal reproduction schedule to the user.

In the content processing device, each piece of content may be associated with preference indicating a user preference for the content; and the device may further include additional content sensing means for sensing content with the highest preference as the additional content.

Accordingly, it becomes possible to add the additional content which best matches the user preference and thereby produce an optimal reproduction schedule to the user.

In the content processing device, each piece of content may be associated with preference indicating a user preference for the content; and the device may further include time slot sensing means for sensing, as the predetermined time slot, a time slot in the reproduction schedule in which is scheduled content with the lowest preference.

Accordingly, it becomes possible to make an effective use of a time slot in which is scheduled content which does not match the user preference as a time slot for additional content.

For example, the time slot sensing means senses a time slot in which is scheduled content which has the lowest preference in an electronic program table. Then, the reference content identifying means identifies reference content on the basis of the time slot and, on the basis of the reference content, the additional content identifying means identifies additional content. Accordingly, it becomes possible to place the additional content in a time slot sensed by the time slot sensing means.

That is, a reproduction schedule can be produced by scheduling another piece of content in the time slot in which is scheduled the content which least matches the user preference in the reproduction schedule. The other piece of content is additional content, and content which is suited to be scheduled as the additional content in the time slot is identified.

As a result, it becomes possible to replace the content with the lowest preference in the reproduction schedule with the related content which is useful to the user. Therefore, an optimal reproduction schedule to the user can be produced.

Alternatively, the content processing device may further include, in addition to the foregoing configuration, time slot sensing means for sensing, as the predetermined time slot, a time slot in a reproduction schedule in which is scheduled content which is to be recorded as specified by a timer recording command issued as to either broadcast content transmitted on a broadcast wave or delivered content deliver over a communications network.

Accordingly, it becomes possible to make effective use of the time slot in which timer recorded broadcast content or delivered content is scheduled to schedule additional content.

The timer-recorded content is stored so that the user view the recorded content any time. Therefore, the user does not need to view content in real time as listed in a reproduction schedule. Therefore, by scheduling another piece of content useful to the user replacing the timer recorded content, it becomes possible to produce a reproduction schedule in which is scheduled more content which is preferably viewed by the user.

The content included in the reproduction schedule managed by the content processing device may be any one of (1) content scheduled in a reproduction schedule for broadcast content transmitted on a broadcast wave or in a reproduction schedule for delivered content delivered over a communications network, (2) broadcast content transmitted on a broadcast wave and recorded, (3) delivered content obtained in advance over a communications network, and (4) content contained in a removable storage medium in the device.

Accordingly, any piece of content scheduled in at least one of an electronic program table and a delivery plan table serves as reference content. A reproduction schedule can be thus produced by scheduling additional content related the reference content in a suitable time slot for the reference content. Further, the stored content contained in the storage may be content which was broadcast and recorded, content stored on a removable storage medium in the device, or content delivered over a wireless or wired network. A reproduction schedule including the aforementioned stored content can be produced.

Further, the content processing device preferably further includes, in addition to the foregoing configuration, reproduction schedule output means for outputting the reproduction schedule to a display so that the additional content scheduled in the reproduction schedule is displayed by an icon, a graphic, a symbol, or a character.

According to the configuration, when related additional content is scheduled in temporal proximity of reference content, the reproduction schedule output means outputs a reproduction schedule which shows an icon, a graphic, a symbol, or a character indicating the additional content near the reference content so that the user can visually recognize the availability of the additional content.

Accordingly, a marking by which the additional content can be recognized is displayed near the position where the reference content is scheduled; the user can recognize the availability of content related to the content.

Here, the icon, graphic, symbol, and character are such an object that upon seeing the marking, the user can recognize the content indicated by the marking.

Therefore, for example, audio data may be output provided that the user can recognize the additional content.

Further, the content processing device preferably further includes, in addition to the foregoing configuration, reproduction means for reproducing content in accordance with a reproduction schedule in which the additional content is scheduled.

According to the configuration, the reproduction means executes a reproduction of content in accordance with a reproduction schedule in which the additional content is scheduled as mentioned above.

Accordingly, the content is reproduced in accordance with an optimal reproduction schedule to the user for the user to view. For example, since related content is scheduled at positions in temporal proximity, the user can collectively view the related content.

A content processing method in accordance with the present invention, to solve the problems, is characterized in that it is a content processing method implemented by a content processing device for managing a reproduction schedule specifying time slots in which content is reproduced, each piece of content being associated with content information indicating an attribute of the piece of content, to add new additional content to the reproduction schedule on the basis of reference content scheduled in a time slot in the reproduction schedule, the method including the steps of: (a) identifying, as the additional content, content associated with content information which meets conditions determined on the basis of content information of the reference content; and (b) determining, based on time slot determining procedure information based on which a time slot is determined for the additional content related to the reference content, a time slot for the additional content identified in step (a).

Another content processing method in accordance with the present invention, to solve the problems, is characterized in that it is a content processing method implemented by a content processing device for managing a reproduction schedule specifying time slots in which content is reproduced, each piece of content being associated with content information indicating an attribute of the piece of content, to determine, on the basis of reference content scheduled in a time slot in the reproduction schedule, a time slot for additional content newly added to the reproduction schedule, the method including the steps of: (a) identifying, as the reference content, content associated with content information which meets conditions determined on the basis of content information of the additional content; and (b) determining a time slot for the additional content based on time slot determining procedure information based on which a time slot is determined for the additional content related to the reference content identified in step (a).

Another content processing method in accordance with the present invention, to solve the problems, is characterized in that it is a content processing method implemented by a content processing device for managing a reproduction schedule specifying time slots in which content is reproduced, each piece of content being associated with content information indicating an attribute of the piece of content, to determine, on the basis of reference content scheduled in a time slot in the reproduction schedule, additional content newly added to a predetermined time slot in the reproduction schedule, the method including the steps of: (a) identifying reference content which corresponds to the predetermined time slot on the basis of content search information indicating association between a time slot in the reproduction schedule and content, associated with that time slot, which is scheduled in the reproduction schedule; and (b) identifying, as the additional content, content associated with content information which meets conditions determined on the basis of content information of the reference content identified in step (a).

The content processing device may be realized on a computer. In a case like this, the scope of the present invention encompasses a control program, for the content processing device, which realizes the content processing device on a computer by causing a computer to function as each means in the content processing device, as well as a computer-readable storage medium containing the program.

What is claimed is:

1. A content processing device for managing a reproduction schedule specifying time slots in which plural pieces of content including content reproducible at any time are reproduced, each piece of content being associated with content information indicating an attribute of the piece of content,
to add new additional content to the reproduction schedule on the basis of reference content scheduled in advance in a time slot in the reproduction schedule,
the device comprising:
additional content identifying means for identifying, as the additional content, content associated with content information which meets conditions determined on the basis of content information of the reference content; and
time slot determining means for arbitrarily determining, based on time slot determining procedure information based on which a time slot is determined for the additional content related to the reference content, a time slot for the additional content identified by the additional content identifying means,
wherein the time slot determining means determines a time slot for the additional content thus identified based only on the time slot determining procedure information, among time slots in which other contents have already been scheduled in the reproduction schedule and vacant time slots which have not yet been scheduled with content,
each piece of content is associated with preference indicating a user preference for the content; and
the time slot determining procedure information is information instructing to determine,. as the time slot of the additional content, a time slot of content, scheduled in the reproduction schedule, which is associated with preference less than or equal to a predetermined threshold value.

2. The content processing device of claim 1, wherein
the time slot determining procedure information is information instructing to determine, as the time slot of the additional content, a time slot immediately before and/or immediately after the reference content.

3. The content processing device of claim 1, wherein
the time slot determining procedure information is information instructing to determine, as the time slot of the additional content, a time slot in a period identified by (i) a reproduction starting time of the reference content and (ii) a point in time a predetermined time before the reproduction starting time and/or a period identified by (i) a reproduction ending time of the reference content and (ii) a point in time a predetermined time after the reproduction ending time.

4. A content processing device for managing a reproduction schedule specifying time slots in which plural pieces of content including content reproducible at any time are reproduced, each piece of content being associated with content information indicating an attribute of the piece of content,
to add new additional content to the reproduction schedule on the basis of reference content scheduled in advance in a time slot in the reproduction schedule,
the device comprising:
additional content identifying means for identifying, as the additional content, content associated with content information which meets conditions determined on the basis of content information of the reference content; and
time slot determining means for arbitrarily determining, based on time slot determining procedure information based on which a time slot is determined for the additional content related to the reference content, a time slot for the additional content identified by the additional content identifying means,
wherein the time slot determining means determines a time slot for the additional content thus identified based only on the time slot determining procedure information, among time slots in which other contents have already been scheduled in the reproduction schedule and vacant time slots which have not yet been scheduled with content,
the content processing device further comprising:

relevance calculating means for calculating a degree of relation between the reference content and each piece of content based on the content information of the reference content and the content information of each piece of content, wherein the additional content identifying means identifies, as the additional content, content with the highest degree of relation with the reference content calculated by the relevance calculating means.

5. The content processing device of claim 1, wherein:
each piece of content is associated with preference indicating a user preference for the content; and
the additional content identifying means identifies content with the highest preference as the additional content.

6. The content processing device of claim 1, further comprising a communications device for obtaining over a communications network the additional content identified by the additional content identifying means.

7. The content processing device of claim 1, wherein:
each piece of content is associated with preference indicating a user preference for the content; and
the device further comprises reference content sensing means for sensing content with the highest preference as the reference content.

8. The content processing device of claim 1, wherein the content reproducible at any time is any one of (1) on-demand content delivered over a communications network, (2) broadcast content transmitted on a broadcast wave and recorded, (3) delivered content obtained in advance over a communications network and recorded, and (4) content contained in a removable storage medium in the device.

9. The content processing device of claim 1, further comprising reproduction schedule output means for outputting the reproduction schedule to a display so that the additional content scheduled in the reproduction schedule is displayed by an icon, a graphic, a symbol, or a character.

10. The content processing device of claim 1, further comprising reproduction means for reproducing content in accordance with a reproduction schedule in which the additional content is scheduled.

11. A content processing method implemented by a content processing device for managing a reproduction schedule specifying time slots in which plural pieces of content including content reproducible at any time are reproduced, each piece of content being associated with content information indicating an attribute of the piece of content,
to add new additional content to the reproduction schedule on the basis of reference content scheduled in advance in a time slot in the reproduction schedule,
the method comprising the steps of:
(a) identifying, as the additional content, content associated with content information which meets conditions determined on the basis of content information of the reference content; and
(b) arbitrarily determining, based on time slot determining procedure information based on which a time slot is determined for the additional content related to the reference content, a time slot for the additional content identified in step (a),
wherein in step (b), a time slot for the additional content thus identified is determined based only on the time slot determining procedure information, among time slots in which other contents have already been scheduled in the reproduction schedule and vacant time slots which have not yet been scheduled with content;
each piece of content is associated with preference indicating a user preference for the content; and
the time slot determining procedure information is information instructing to determine, as the time slot of the additional content, a time slot of content, scheduled in the reproduction schedule, which is associated with preference less than or equal to a predetermined threshold value.

12. A non-transitory computer-readable storage medium containing the control program for operating a content processing device for managing a reproduction schedule specifying time slots in which plural pieces of content including content reproducible at any time are reproduced, each piece of content being associated with content information indicating an attribute of the piece of content,
to add new additional content to the reproduction schedule on the basis of reference content scheduled in advance in a time slot in the reproduction schedule,
the program causing a computer to implement the steps of:
(a) identifying, as the additional content, content associated with content information which meets conditions determined on the basis of content information of the reference content; and
(b) arbitrarily determining, based on time slot determining procedure information based on which a time slot is determined for the additional content related to the reference content, a time slot for the additional content identified in step (a),
wherein in step (b), a time slot for the additional content thus identified is determined based only on the time slot determining procedure information, among time slots in which other contents have already been scheduled in the reproduction schedule and vacant time slots which have not yet been scheduled with content,
each piece of content is associated with preference indicating a user preference for the content, and
the time slot determining procedure information is information instructing to determine, as the time slot of the additional content, a time slot of content, scheduled in the reproduction schedule, which is associated with preference less than or equal to a predetermined threshold value.

13. A content processing method implemented by a content processing device for managing a reproduction schedule specifying time slots in which plural pieces of content including content reproducible at any time are reproduced, each piece of content being associated with content information indicating an attribute of the piece of content,
to add new additional content to the reproduction schedule on the basis of reference content scheduled in advance in a time slot in the reproduction schedule,
the method comprising the steps of:
(a) identifying, as the additional content, content associated with content information which meets conditions determined on the basis of content information of the reference content;
(b) arbitrarily determining, based on time slot determining procedure information based on which a time slot is determined for the additional content related to the reference content, a time slot for the additional content identified in step (a),
wherein in step (b), a time slot for the additional content thus identified is determined based only on the time slot determining procedure information, among time slots in which other contents have already been scheduled in the reproduction schedule and vacant time slots which have not yet been scheduled with content; and
(c) calculating a degree of relation between the reference content and each piece of content based on the content information of the reference content and the content information of each piece of content, wherein the additional content identifying means identifies, as the additional content, content with the highest degree of relation with the reference content calculated by the relevance calculating means.

14. A non-transitory computer-readable storage medium containing the control program for operating a content processing device for managing a reproduction schedule specifying time slots in which plural pieces of content including content reproducible at any time are reproduced, each piece of content being associated with content information indicating an attribute of the piece of content, to add new additional content to the reproduction schedule on the basis of reference content scheduled in advance in a time slot in the reproduction schedule, the program causing a computer to implement the steps of:

(a) identifying, as the additional content, content associated with content information which meets conditions determined on the basis of content information of the reference content;

(b) arbitrarily determining, based on time slot determining procedure information based on which a time slot is determined for the additional content related to the reference content, a time slot for the additional content identified in step (a), wherein in step (b), a time slot for the additional content thus identified is determined based only on the time slot determining procedure information, among time slots in which other contents have already been scheduled in the reproduction schedule and vacant time slots which have not yet been scheduled with content; and (c) calculating a degree of relation between the reference content and each piece of content based on the content information of the reference content and the content information of each piece of content, wherein the additional content identifying means identifies, as the additional content, content with the highest degree of relation with the reference content calculated by the relevance calculating means.

* * * * *